US011275237B2

(12) United States Patent
Brick et al.

(10) Patent No.: US 11,275,237 B2
(45) Date of Patent: Mar. 15, 2022

(54) APPARATUS FOR PRESENTING AN IMAGE

(71) Applicant: OSRAM Opto Semiconductors GmbH, Regensburg (DE)

(72) Inventors: Peter Brick, Regensburg (DE); Uli Hiller, Bad Abbach (DE); Stefan Morgott, Pentling (DE)

(73) Assignee: OSRAM OLED GmbH, Regensburg (DE)

( * ) Notice: Subject to any disclaimer, the term of this patent is extended or adjusted under 35 U.S.C. 154(b) by 207 days.

(21) Appl. No.: 15/945,830

(22) Filed: Apr. 5, 2018

(65) Prior Publication Data
US 2018/0299673 A1    Oct. 18, 2018

(30) Foreign Application Priority Data
Apr. 5, 2017   (DE) .................... 10 2017 107 302.7

(51) Int. Cl.
*G02B 27/01* (2006.01)
*G02B 27/30* (2006.01)
(Continued)

(52) U.S. Cl.
CPC ..... *G02B 27/0101* (2013.01); *G02B 19/0014* (2013.01); *G02B 19/0066* (2013.01);
(Continued)

(58) Field of Classification Search
CPC ............................ G03B 27/0101; G03B 27/30; G02B 19/0014; G02B 19/0066; G02B 27/0961; G02B 27/0977
(Continued)

(56) References Cited

U.S. PATENT DOCUMENTS 6,154,259 A  *  11/2000  Hargis ................. H04N 5/7416
                                                           348/756
6,945,652 B2 *   9/2005  Sakata ............... G03B 21/2033
                                                           348/201
(Continued)

FOREIGN PATENT DOCUMENTS

CN       102207278 A     10/2011
DE       101 44 075 A1    4/2003
JP       401287531 A  *   9/1989 ............. G02F 1/383

OTHER PUBLICATIONS

MachineTranslationof401287531A (Year: 2020).*

*Primary Examiner* — Jerry L Brooks
(74) *Attorney, Agent, or Firm* — DLA Piper LLP (US)

(57) ABSTRACT

An apparatus for presenting an image for a heads-up display includes three arrays of light-emitting diodes, wherein the light-emitting diodes of an array are arranged and output electromagnetic beams in an emission direction of an emission side of the array, the light-emitting diodes output an electromagnetic beam with a first opening angle in the emission direction, a collimation apparatus provided on the emission side at a specified spacing in front of the array of the light-emitting diodes, wherein the collimation apparatus reduces the first opening angles of the beams of the light-emitting diodes downstream of the collimation apparatus in the emission direction to a second opening angle, the second opening angle is smaller than the first opening angle, and a combination optical unit arranged downstream of the collimation apparatus in the emission direction, the combination optical unit superposes the electromagnetic rays from the three arrays to form an image for the head-up display.

20 Claims, 24 Drawing Sheets

(51) Int. Cl.
*G02B 27/09* (2006.01)
*G02B 19/00* (2006.01)

(52) U.S. Cl.
CPC ..... *G02B 27/0961* (2013.01); *G02B 27/0977* (2013.01); *G02B 27/30* (2013.01)

(58) Field of Classification Search
USPC ........................................................ 359/630
See application file for complete search history.

(56) References Cited

U.S. PATENT DOCUMENTS

| | | | |
|---|---|---|---|
| 2005/0018141 A1* | 1/2005 | Hosaka | H04N 9/315 353/31 |
| 2005/0146652 A1* | 7/2005 | Yokoyama | G02B 27/1053 349/61 |
| 2009/0115970 A1* | 5/2009 | Morejon | G02B 5/045 353/38 |
| 2010/0202129 A1* | 8/2010 | Abu-Ageel | G02B 19/0066 362/84 |
| 2014/0049943 A1* | 2/2014 | Brick | G02B 6/0028 362/97.1 |
| 2015/0226970 A1 | 8/2015 | Mukawa | |
| 2016/0299347 A1* | 10/2016 | Petrov | G02B 27/0012 |

* cited by examiner

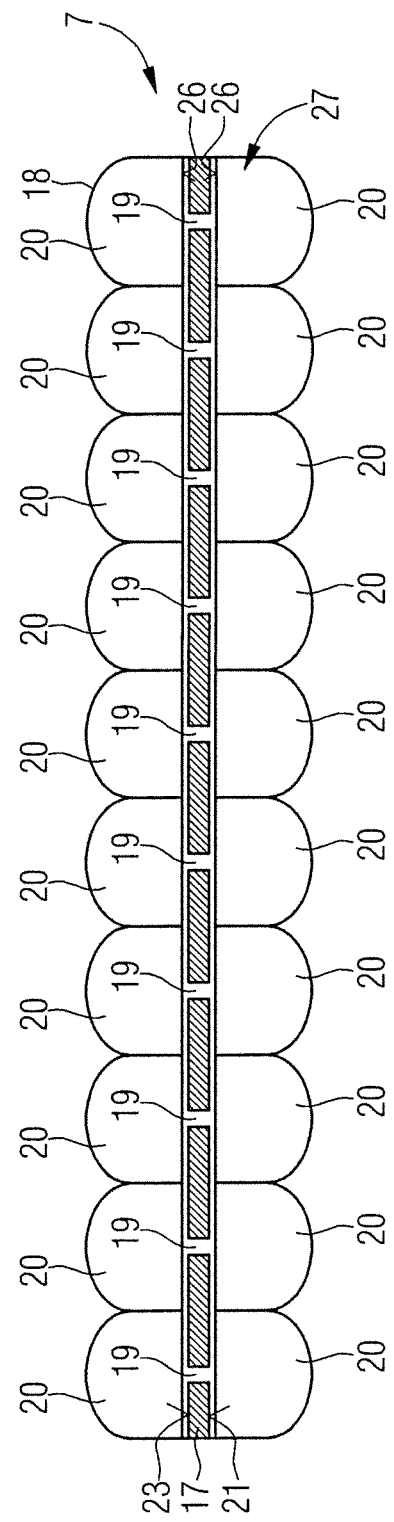

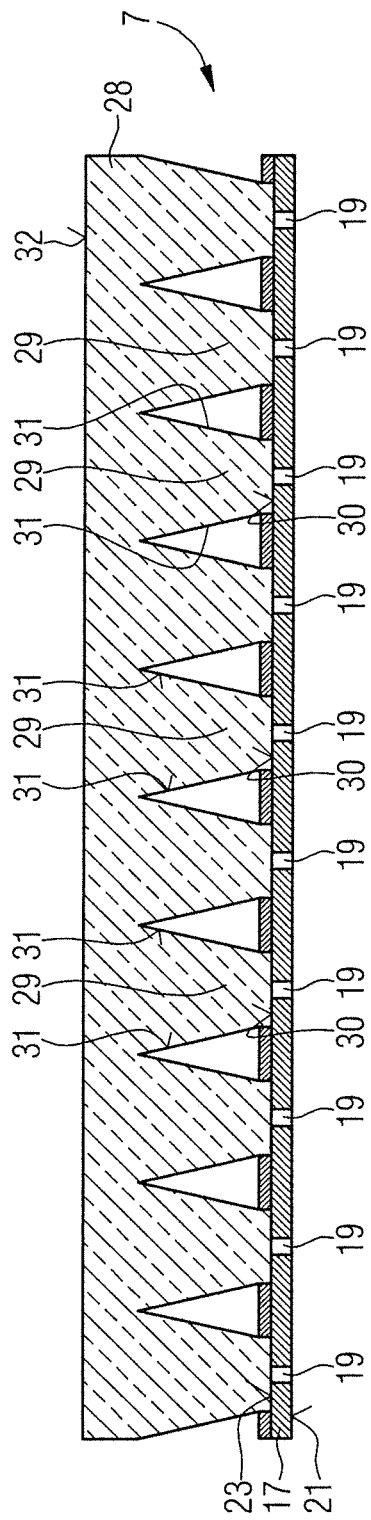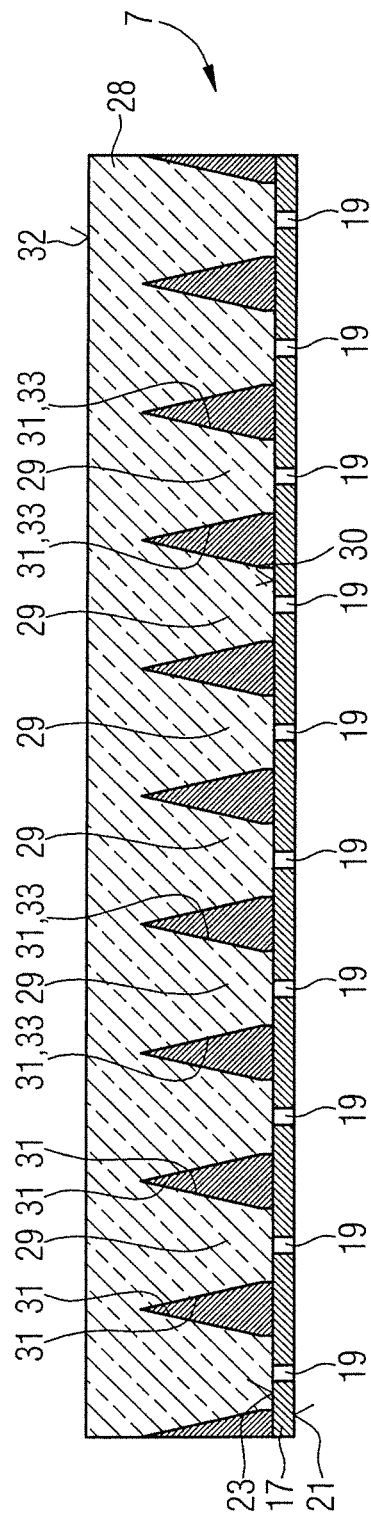

APPARATUS FOR PRESENTING AN IMAGE

TECHNICAL FIELD

This disclosure relates to an apparatus for presenting an image, a method of adjusting a control circuit for presenting an image, and a method of operating an apparatus for presenting an image.

BACKGROUND

It is known to use light-emitting diodes to present an image for a heads-up display. There is nonetheless a need for an improved apparatus for presenting an image for a heads-up display.

SUMMARY

We provide an apparatus for presenting an image for a heads-up display including three arrays of light-emitting diodes, wherein the light-emitting diodes of an array are arranged and output electromagnetic beams in an emission direction of an emission side of the array, the light-emitting diodes output an electromagnetic beam with a first opening angle in the emission direction, a collimation apparatus provided on the emission side at a specified spacing in front of the array of the light-emitting diodes, wherein the collimation apparatus reduces the first opening angles of the beams of the light-emitting diodes downstream of the collimation apparatus in the emission direction to a second opening angle, the second opening angle is smaller than the first opening angle, and a combination optical unit arranged downstream of the collimation apparatus in the emission direction, the combination optical unit superposes the electromagnetic rays from the three arrays to form an image for the head-up display.

We also provide a method of adjusting a control circuit for presenting an image for a heads-up display including providing at least two arrays of light-emitting diodes, wherein the light-emitting diodes of each array are individually actuable by a control circuit, and the light-emitting diodes of an array output electromagnetic beams in an emission direction of an emission side of the array, providing a combination optical unit in the emission directions of the arrays, wherein the combination optical unit superposes the electromagnetic rays of the three arrays to form an image for a heads-up display, wherein generating a test image with at least two arrays, performing a check as to whether a partial image of an array projects beyond a specified image, and, upon detecting an overlap of the partial image beyond the image, setting the control circuit of the apparatus in a way such that the light-emitting diodes that cause the overlap are not actuated.

We further provide a method of operating an apparatus for presenting an image for a heads-up display including providing three arrays of light-emitting diodes, wherein the light-emitting diodes of each array are individually actuable by a control circuit, and the light-emitting diodes of an array output electromagnetic beams in an emission direction of an emission side of the array, providing a combination optical unit in the emission directions of the arrays, wherein the combination optical unit superposes the electromagnetic rays of the three arrays to form an image for a head-up display, and causing the control circuit to actuate the light-emitting diodes of the arrays such that an overlap of a partial image of an array beyond the image is prevented.

BRIEF DESCRIPTION OF THE DRAWINGS

FIG. 13 shows a schematic cross section of a pinhole plate with a sub-lens array on the incidence side and a further sub-lens array on the emission side.

FIG. 14 shows a schematic cross section of a further example of a pinhole plate with a taper array having optical tapers.

FIG. 15 shows a schematic cross section of a pinhole plate with a taper array in a further example.

Figure 1:
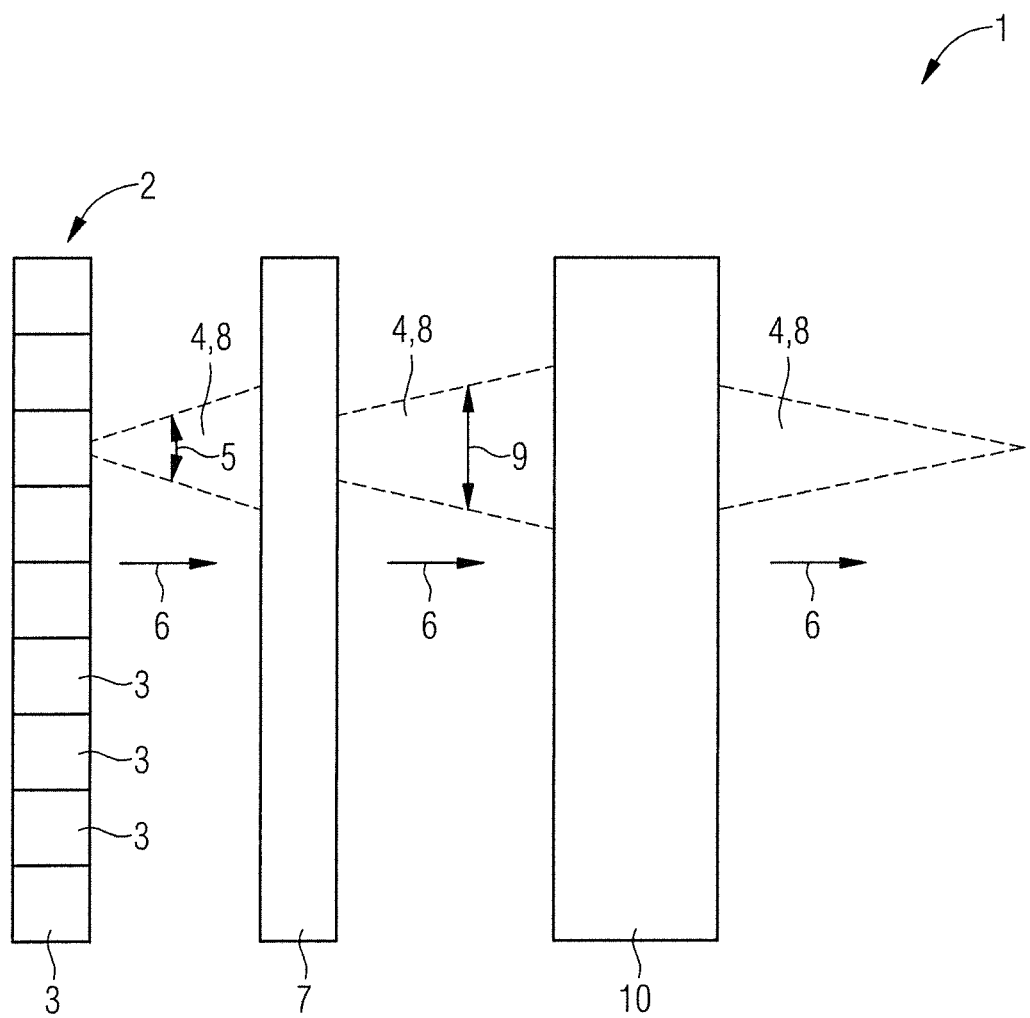
FIG. 1 shows a schematic side view of an apparatus for presenting an image.

LIST OF REFERENCE SIGNS 1 apparatus for presenting images
2 array
3 light-emitting diodes
4 electromagnetic radiation
5 first opening angle
6 emission direction
7 collimation apparatus
8 beam
9 second opening angle
10 optical imaging apparatus
12 light-emitting pixel
13 lens array
14 lens element
15 collimation lens
16 first frame
17 pinhole plate
18 sub-lens array
19 hole
20 sub-lens
21 incidence side
22 further material
23 emission side
24 external electric radiation
25 spacing
26 planar side
27 second sub-lens array
28 taper layer
29 optical taper
30 inner side taper
31 outer face
32 outer side taper
33 cylinder cone
34 filter element
35 surface
36 planarization element
37 mirror
39 reflection structure
40 central axis
41 inner side
42 emission opening
43 LED
47 rear-side contact
48 substrate
49 electronic circuit
50 driver circuit
51 interface
52 electrical terminal
53 light-emitting layer
54 central region
55 surrounding region
56 edge region
57 center point
58 side edge
59 arrangement
60 component
61 further component
100 apparatus
101 first array
102 second array
103 third array
104 combination optical unit
105 imaging optical unit
106 expanding element
107 image plane
108 first partial image
109 second partial image
110 third partial image
112 specified image
113 first overlap region
114 second overlap region
115 third overlap region
116 overall direction
117 first reflection plane
118 second reflection plane
119 control circuit
120 intermediate plane
121 second imaging optical unit
130 memory
201 first step
202 second step

DETAILED DESCRIPTION

One advantage of our apparatus is that a collimation apparatus is provided between an array of light-emitting diodes and a combination optical unit, wherein the collimation apparatus reduces a first opening angle of the beams from the light-emitting diodes to a second, smaller opening angle. It is possible in this way to obtain improved image presentation.

The collimation apparatus may have a plurality of collimation lenses. A collimation lens is provided for at least one beam from a light-emitting diode. The collimation lens reduces the first opening angle of the beam of the light-emitting diode to the second opening angle. The collimation lenses of the collimation apparatus can have an identical configuration and allow the same reduction of the first opening angle to the second opening angle. The collimation apparatus can also have different collimation lenses, wherein the different collimation lenses make possible a varying size and/or a varying degree of reduction of the first opening angle to different second opening angles. Hereby, further optimization of the beam guidance can be achieved.

Each collimation lens can be provided for at least two beams from two light-emitting diodes. A collimation lens may be provided for at least three beams from three light-emitting diodes. One collimation lens of the collimation apparatus can additionally be provided for one image pixel. An image pixel can comprise one, two, three or more light-emitting diodes.

One lens element of the lens array may be provided for one collimation lens. One lens element of the lens array can additionally be provided for a plurality of collimation lenses. This can result in a simplified setup with good quality of the presented image. For example, a lens element of the lens array can be provided for the collimation lenses of an image pixel. In this way, the beams of the image pixel are focused onto the imaging plane by a lens element. This can result in an improved image quality.

The collimation apparatus can have a pinhole plate or a pinhole plate with a sub-lens array. The pinhole plate has a plurality of holes. The sub-lens array has a plurality of sub-lenses. One sub-lens can be associated with each hole in the pinhole plate. One sub-lens can be arranged on an incidence side and/or on an emission side of the pinhole plate. Using the pinhole plate, or the pinhole plate and the sub-lens, focusing of a beam of a light-emitting diode from the first opening angle to the second opening angle is effected.

The pinhole plate can be effective for the electric beams on an incidence side facing the array of light-emitting diodes. The reflectance can be greater than 30%, in particular greater than 50% or greater than 80%. In this way, a reduction of emission losses is achieved. The reflected rays can be radiated back again by the light-emitting diode array and consequently increase the radiant power of the apparatus overall.

One sub-lens may be provided for beams of a plurality of light-emitting diodes. In particular, one sub-lens can be provided for the beams of the light-emitting diodes of one image pixel. The apparatus may have one hole in the pinhole plate to provide for beams of a plurality of light-emitting diodes. This results in a simplified setup of the apparatus with good quality of the presented image.

A plurality of sub-lenses may be provided for a beam from one light-emitting diode. The apparatus may have a plurality of holes in the pinhole plate to provide for a beam of one light-emitting diode. Hereby, improved beam guidance is achieved.

For example, one hole in the pinhole plate and/or one sub-lens of the lens array can be provided for a plurality of light-emitting pixels, wherein one light-emitting pixel has three light-emitting diodes with the light colors red, green and blue. A light-emitting pixel produces in particular one image point of the presented image.

The pinhole plate may have a spacing from the light-emitting diodes shorter than an edge length of a light-emitting diode. This achieves improved beam guidance of the beams of the light-emitting diodes. The pinhole plate may have a spacing from the light-emitting diodes shorter than an edge length of a light-emitting pixel. A light-emitting pixel comprises at least the light-emitting diodes required to present an image point of the presented image. A light-emitting pixel can have, for example, two light-emitting diodes, in particular three light-emitting diodes or even more light-emitting diodes.

The collimation apparatus may have an optical filter element, wherein the filter element transmits beams in a specified angle of incidence range and blocks beams outside the angle of incidence range. In this way, a desired reduction of the first opening angle of the beams to the second, smaller opening angle can be achieved. For example, the optical filter element can reflect back and/or absorb the beams incident on the filter element outside of the specified angle of incidence range.

The filter element may be formed from a material transparent for the beams. The filter element has a structured surface, wherein the surface achieves a desired reduction of the first opening angle of the beams to the second, smaller opening angle by way of total internal reflection at the structured surface. Hereby, a simple setup of the optical filter element can be implemented. For example, the surface can be in the shape of pyramids, prisms, cone arrays or crossed prisms. To achieve the desired filter function, various geometric shapes of the structured surface can be used.

The filter element may have a layer structure of dielectric layers. The layer structure is transparent for the beams if the beams are incident on the layer structure in the specified angle of incidence range. Outside the angle of incidence range, the beams are reflected and/or absorbed. In this way, a desired reduction of the first opening angle of the beams to the second, smaller opening angle can be achieved.

The filter element may have a spacing from the light-emitting diodes shorter than an edge length of a light-emitting diode. The filter element may have a spacing from the light-emitting diodes shorter than an edge length of a light-emitting pixel. A light-emitting pixel comprises at least the light-emitting diodes required to present an image point of the presented image. A light-emitting pixel can have, for example, two light-emitting diodes, in particular three light-emitting diodes or even more light-emitting diodes.

The collimation apparatus may have a reflection structure that tapers as viewed in the emission direction. In this way, a desired reduction of the first opening angle of the beams to the second, smaller opening angle can be achieved.

The reflection structure has reflective inner faces. One reflection structure can be provided for at least one light-emitting diode. It is additionally possible for one reflection structure to be provided for a plurality of light-emitting diodes, in particular for light-emitting diodes of one light-emitting pixel. An advantageous example of the reflection structure consists of a conically tapering cylinder. With this example, reduction of the first opening angle of a beam to the second opening angle can also be achieved. The reflectance of the inner faces of the reflection structure can be greater than 50%, in particular greater than 80%.

The light-emitting diodes may be individually actuable, wherein the light-emitting diodes are in particular integrated in a component, and wherein a circuit that actuates the light-emitting diodes is in particular integrated in a further component, and wherein the component is in particular arranged on the further component.

The combination optical unit may be a double cube beam splitter. The cube beam splitter has two crossed reflection planes, wherein the two reflection planes are transmissive on one side and reflective on one side. The reflection planes superpose the electromagnetic rays of the three arrays to form an image.

The combination optical unit is in the form of two crossed plates. The two plates are reflective on one side and transmissive on one side. The planes superpose the electromagnetic rays of the three arrays to form an image.

The combination optical unit may be in the form of a diffractive structure. The diffractive structure superposes the electromagnetic rays of the three arrays to form an image.

The combination optical unit in the form of a grating structure. The grating structure superposes the electromagnetic rays of the three arrays to form an image.

Each array may have light-emitting diodes that emit light having the same wavelength range. As a consequence, it is possible, for example, for light-emitting diodes of blue light to be arranged in a first array, light-emitting diodes of a green light to be arranged in a second array, and light-emitting diodes of a red light to be arranged in a third array.

A second imaging optical unit may be provided after the combination optical unit, wherein the second imaging optical unit focuses the electromagnetic rays of the three arrays. Hereby, a further improvement of the presentation of the image in a heads-up display can be achieved. Provided after the combination optical unit may be a second imaging optical unit, wherein the second imaging optical unit focuses the electromagnetic rays from the three arrays in an intermediate plane to form an intermediate image, wherein provided in the intermediate plane is an optical expanding element, wherein the expanding element expands the intermediate image for an image plane. Hereby, a further improvement of the display can be achieved.

The expanding element may be in the form of a microlens array or in the form of a diffuser element. In addition, the expanding element can have a diffuser element or a microlens array.

An optical imaging apparatus may be provided, wherein the optical imaging apparatus focuses the beams onto an imaging plane in front of the combination optical unit. Hereby, a further improvement of the image presentation on the heads-up display can be achieved.

A control circuit that actuates the light-emitting diodes of the arrays may be provided, wherein the control circuit does not actuate at least some of the light-emitting diodes of an array during operation of the array. A memory may be provided to which the control circuit is connected. Information is stored in the memory, wherein the information indicates which light-emitting diodes are actuated during operation and which are not. In this way, an overlap of electromagnetic radiation of an array beyond a specified image can be avoided. For example, it is possible for edge regions of an array not to be activated during operation to avoid the overlap beyond the specified image.

Additionally proposed is a method of adjusting a control circuit for presenting an image for a heads-up display. At least two arrays of light-emitting diodes are provided. The light-emitting diodes of each array are individually actuable by the control circuit. The light-emitting diodes of an array are arranged and output electromagnetic beams in an emission direction of an emission side of the array. Provided in the emission directions of the arrays is a combination optical unit, wherein the combination optical unit superposes the electromagnetic rays of the three arrays to form an image for a heads-up display. In a first step, a test image is generated with at least two arrays. In a second step, a check is performed as to whether a partial image of an array projects beyond a specified image. The control circuit will be adjusted in a manner such that, if an overlap of the partial image beyond the specified image is detected, the light-emitting diodes that cause the overlap are not actuated. This information can also be permanently stored in a memory connected to the control circuit.

We also provide a method of operating an apparatus for presenting an image for a heads-up display.

The above-described properties, features and advantages, and the manner in which they are achieved, will become clearer and significantly more comprehensible in connection with the following description of examples that will be explained in more detail in connection with the drawings.

FIG. 1 shows a schematic side view of an apparatus 1 that produces electromagnetic radiation. The apparatus 1 comprises an array 2 of light-emitting diodes 3. The light-emitting diodes 3 can be actuated individually or in groups. To this end, a corresponding control apparatus (not illustrated) is provided. The light-emitting diodes 3 of the array 2 can be identical or different. The light-emitting diodes 3 can produce in particular different wavelength spectra of an electromagnetic radiation 4. In addition, individual or all light-emitting diodes 3 can have a conversion element that shifts the wavelength of the electromagnetic radiation 4 from the light-emitting diode 3. The light-emitting diodes 3 output electromagnetic radiation 4 at a first opening angle 5 in an emission direction 6. Provided downstream of the array 2 in the emission direction 6 is a collimation apparatus 7. The emission direction 6 is perpendicular to the plane of the array 2. A light-emitting diode 3 can have an edge length of 0.5 μm to 100 μm.

Each light-emitting diode 3 thus produces a beam 8 having a first opening angle 5. The figure illustrates only one beam 8 from a light-emitting diode 3. The collimation apparatus 7 restricts or collimates the first opening angles 5 of the beams 8 from the light-emitting diodes 3 to a smaller second opening angle 9. Consequently, the beams 8 leave the collimation apparatus 7 in the emission direction 6 with the smaller second opening angle 9.

An optical imaging apparatus 10 can be provided downstream of the collimation apparatus 7 in the emission direction 6. The optical imaging apparatus 10 directs, i.e., images, the beams 8 from the light-emitting diodes 3 as desired. For example, the beams can also be focused by the imaging apparatus 10. The optical imaging apparatus 10 can be, for example, in the form of a lens, a lens system or a lens array.

The apparatus 1 can be used to produce a two-dimensional, in particular a three-dimensional, image using the light-emitting diodes 3 of the array 2. An image is understood to mean any optically perceivable presentation. An image can consist, e.g., only of a single white light point or a presentation of an object or a presentation of a landscape. Owing to the collimation apparatus 7, the first opening angles 5 can be restricted to the second opening angles 9. As a result, mixing of the beams from neighboring light-emitting diodes 3 upon incidence on the optical imaging apparatus 10 is reduced. Improved presentation of the image is thus achieved. In particular, more precise focusing of the beams 8 and an associated higher light intensity of the image is made possible. For example, the opening angle can be defined by the region in which at least 10% of the maximum radiant power of the electromagnetic radiation of the beam is still present. Consequently, the first and/or the second opening angle can be defined by the region in which at least 10% of the maximum radiant power of the electromagnetic radiation of the beam is still present.

Figure 2:
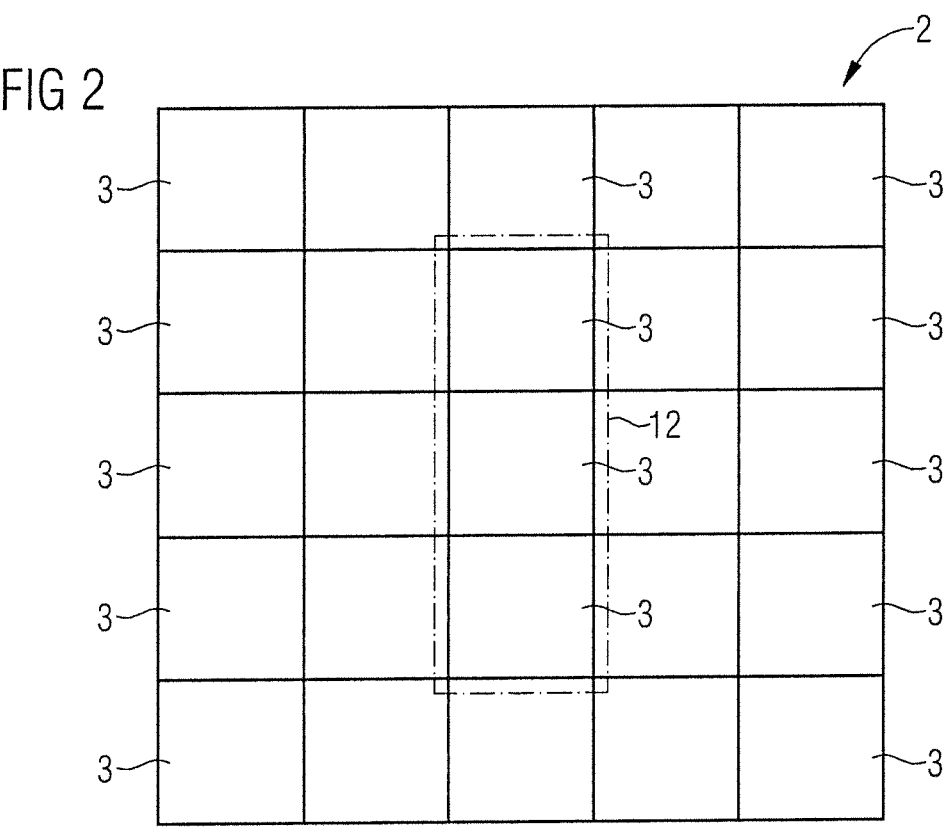
FIG. 2 shows a schematic plan view of an array of light-emitting diodes.

FIG. 2 shows a schematic plan view of a detail of the array 2 of light-emitting diodes 3. The light-emitting diodes 3 in the illustrated example are arranged in a constant grid in rows and columns. The light-emitting diodes 3 are illustrated schematically in the form of squares. The light-emitting diodes 3 can also be provided in a different arrangement in the array 2. A specified number of light-emitting diodes 3 can be arranged to be combined to form one light-emitting pixel 12. A light-emitting pixel 12 can comprise the light-emitting diodes 3 intended to present an image point of an image. In the illustrated example, one light-emitting pixel 12 comprises three light-emitting diodes 3. The light-emitting pixel 12 is drawn by way of a dashed line. The light-emitting pixel 12 can also comprise two light-emitting diodes 3 or more than three light-emitting diodes 3. The light-emitting diodes 3 of the light-emitting pixel can emit electromagnetic radiation having different wavelengths. For example, the light-emitting diodes 3 of the light-emitting pixel 12 can produce different visible colors and in particular produce, in superposition, white light.

Figure 3:
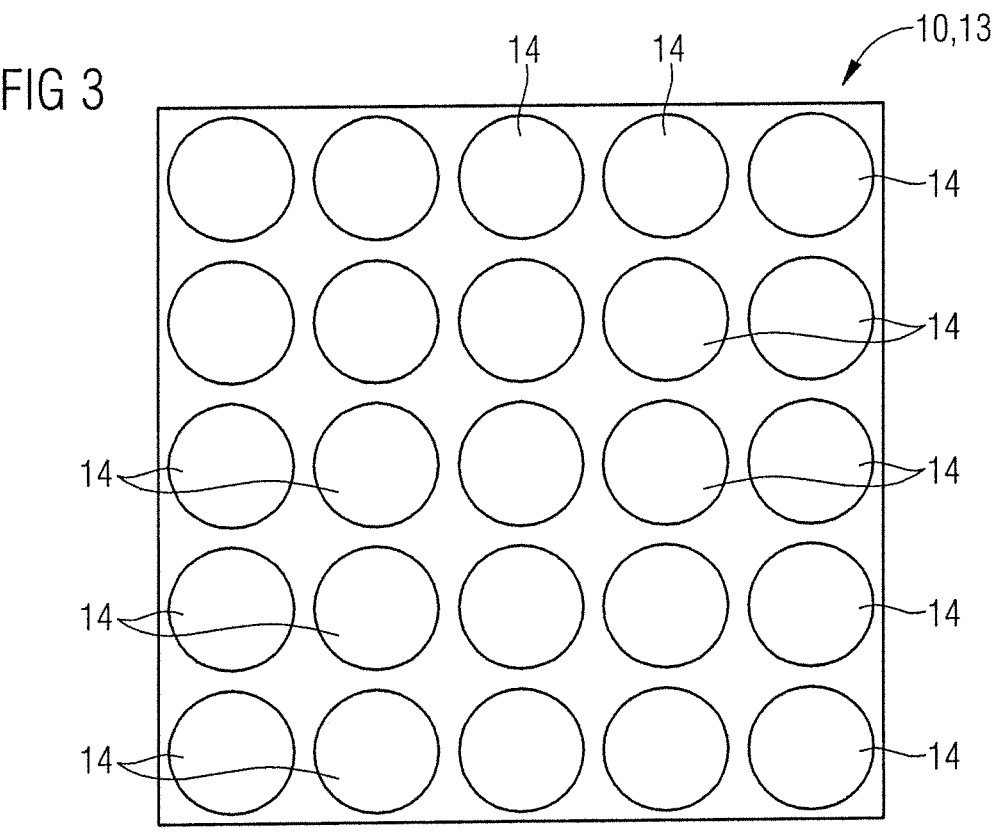
FIG. 3 shows a schematic plan view of a lens array.

FIG. 3 shows a schematic illustration of a plan view of an example of an optical imaging apparatus 10 in the form of a lens array 13 having a multiplicity of lens elements 14. The lens elements 14 represent lenses connected to one another to form an array. The lens elements 14 in the illustrated example are arranged in a constant grid in rows and columns with constant spacings. One lens element 14 can be provided for at least one beam 8 from a light-emitting diode 3. In addition, one lens element 14 can also be provided for a plurality of beams 8 from a plurality of light-emitting diodes 3. By way of example, one lens element 14 can be provided for the beams 8 from the light-emitting diodes 3 of a light-emitting pixel 12. In addition, a plurality of lens elements 14 can also be provided for a beam 8 from one light-emitting diode 3.

Figure 4:
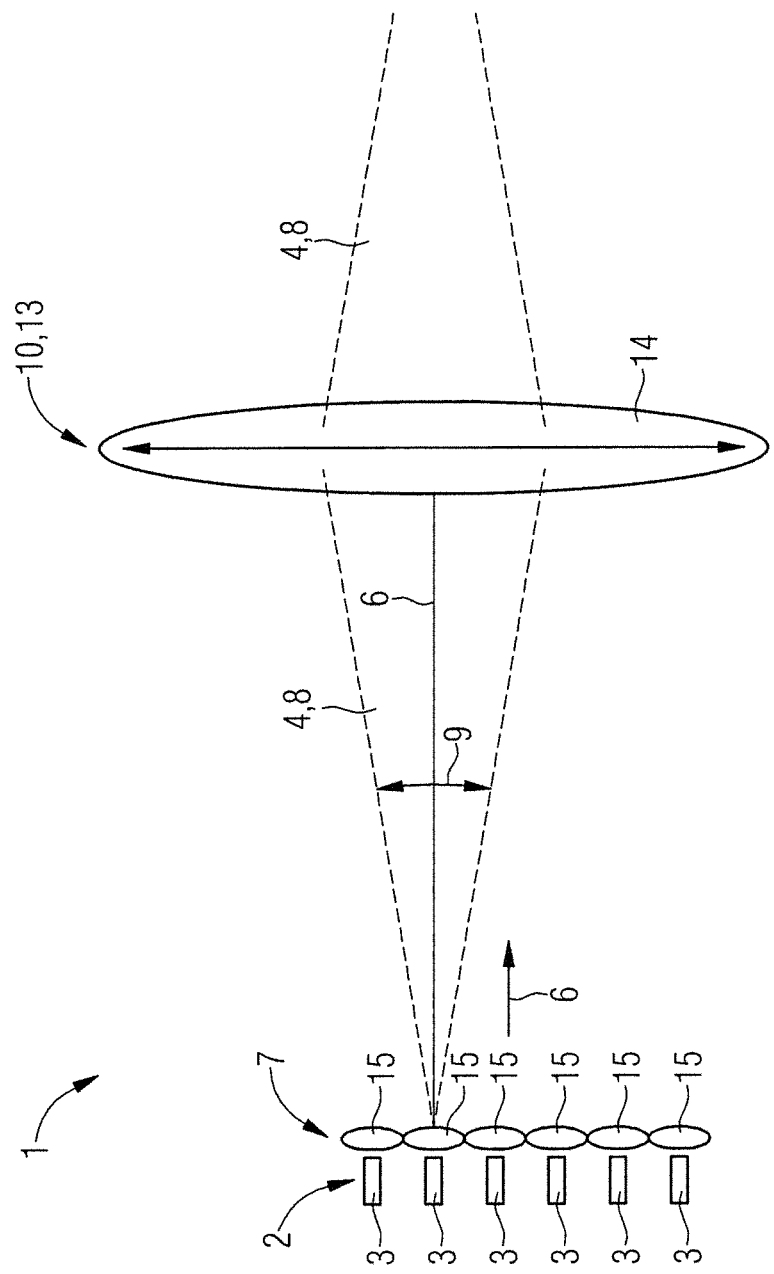
FIG. 4 shows a schematic segment of an apparatus for presenting an image with a collimation apparatus having a plurality of collimation lenses.

FIG. 4 schematically shows an enlarged segment of the apparatus 1 of FIG. 1. Schematically illustrated are six light-emitting diodes 3 of the array 2. The light-emitting diodes 3 can output identical electromagnetic radiation in the emission direction 6 or can output electromagnetic rays 4 having different wavelength spectra in the emission direction 6. For example, it is possible for each of light-emitting diode 3 having a red color spectrum, a light-emitting diode 3 having a green color spectrum and a light-emitting diode 3 having a blue color spectrum to alternate in a row of the array 2. Arranged after the array 2 in the emission direction 6 is the collimation apparatus 7, wherein the collimation apparatus 7 has collimation lenses 15. In the illustrated example, one collimation lens 15 is provided for each light-emitting diode 3 of the array 2. The collimation lenses 15 reduce the first opening angle of the beams 8 to a second opening angle 9. The second opening angle 9 is smaller than the first opening angle 5, for example, by 30%, in particular by up to 50%. The second opening angle 9 can also be smaller than the first opening angle 5, for example, by up to 90%. Schematically arranged downstream of the collimation apparatus 7 in the emission direction 6 is an optical imaging apparatus 10 in the form of a lens array 13, wherein only one lens element 14 of the lens array 13 is illustrated in the illustration.

The first opening angle 5 of the beams 8 from the light-emitting diodes 3 can be, for example, 180° or less. The second opening angle 9 of the beams 8 can be, for example, less than 100°, in particular less than 90°, after the collimation apparatus 7. A light-emitting pixel 12 with a light-emitting diode 3 having a red color spectrum, a second light-emitting diode 3 having a green color spectrum and a third light-emitting diode 3 having a blue color spectrum can comprise, for example, an area of 31.5 μm×31.5 μm. A lens element 14 of the lens array 13 can be provided for imaging a plurality of beams 8 from a plurality of light-emitting diodes 3. By way of example, one lens element 14 can be provided for 12×12 light-emitting pixels 12. A lens element 14 can have a diameter of 378 μm×378 μm. One lens element 14 can be provided for light-emitting diodes 3 of a first wavelength spectrum, for example, red light. A second lens element 14 can be provided for light-emitting diodes of a second wavelength spectrum, for example, green light. A third lens element 14 can be provided for light-emitting diodes of a third wavelength spectrum, for example, blue light. Consequently, beams from a plurality of light-emitting diodes having the same wavelength spectrum can be imaged by one lens element 14.

Figure 5:
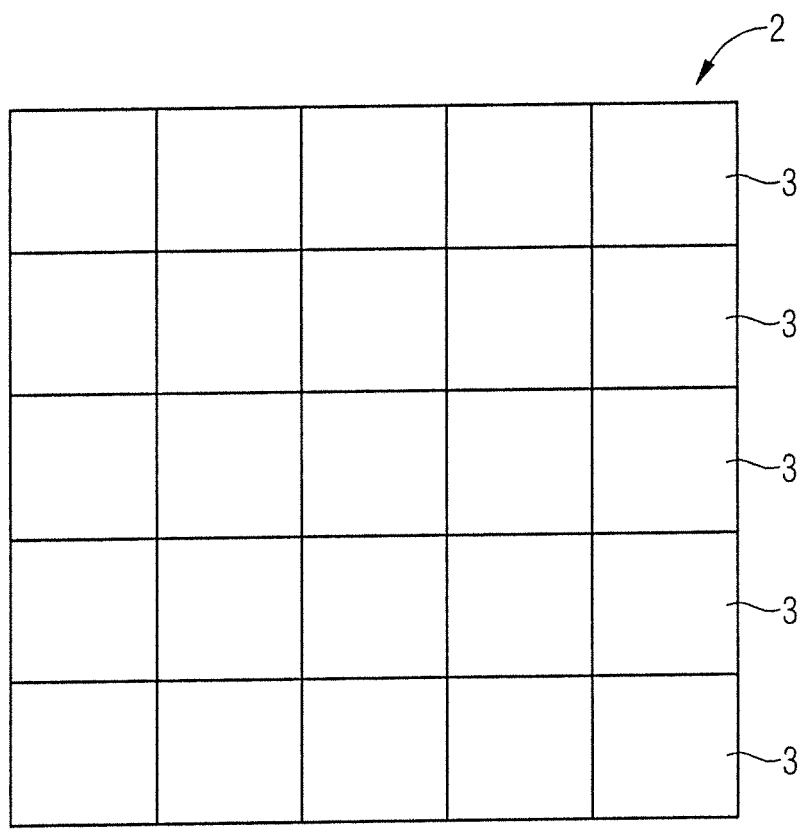
FIG. 5 shows a schematic plan view of the collimation apparatus having collimation lenses of FIG. 4.

FIG. 5 shows a schematic illustration of a plan view of a segment of the array 2 of the light-emitting diodes 3 of FIG. 4. The light-emitting diodes 3 are illustrated schematically as squares.

Figure 6:
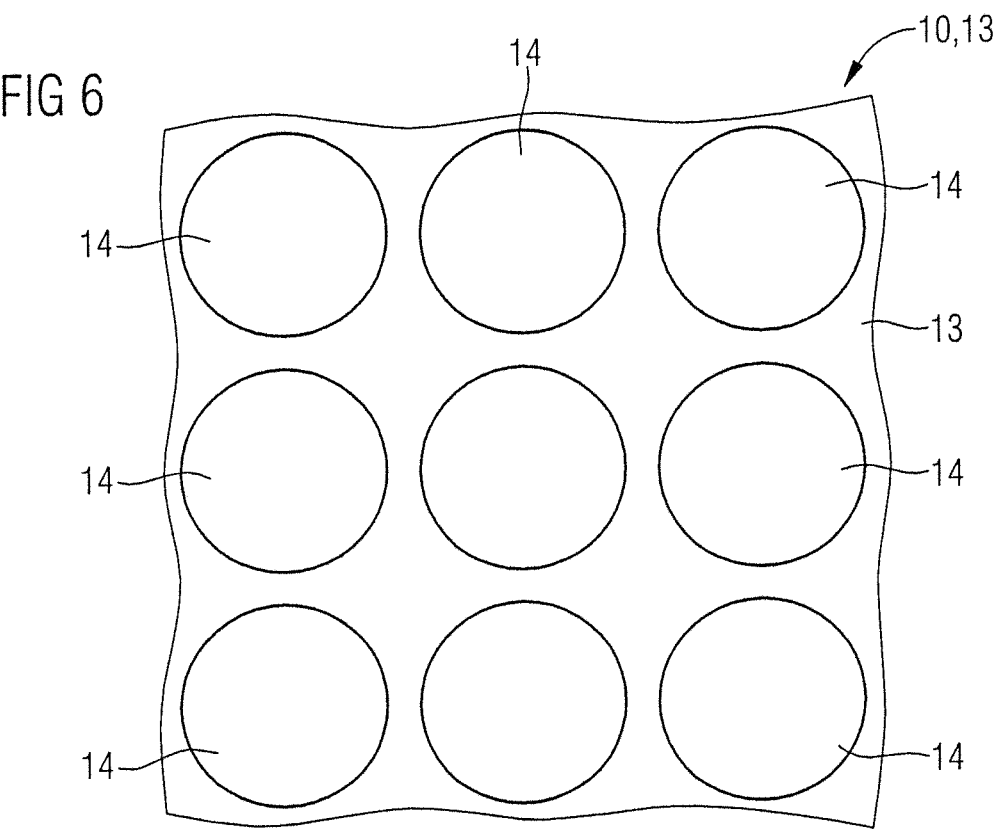
FIG. 6 shows a schematic plan view of a detail of the lens array of FIG. 4.

FIG. 6 shows a schematic illustration of a plan view of a segment of the lens array 13 with the lens elements 14.

Figure 7:
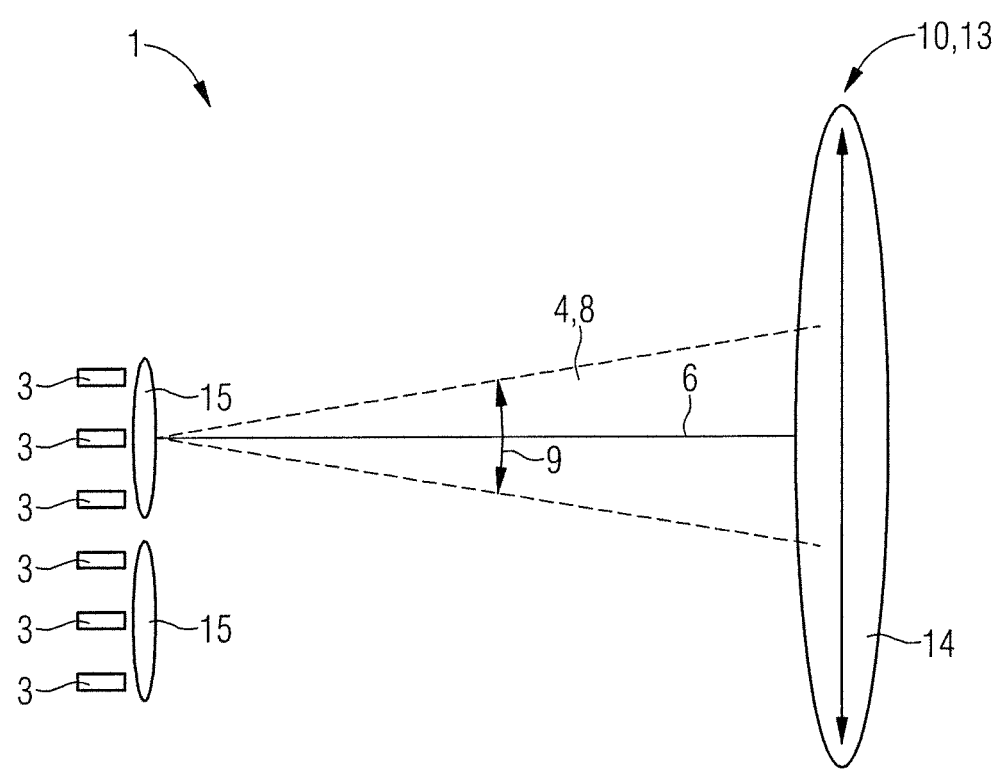
FIG. 7 shows a schematic side illustration of a detail of an apparatus with a collimation apparatus, wherein one collimation lens is provided for a plurality of light-emitting diodes.

FIG. 7 shows a schematic illustration of a detail of a further example of an apparatus 1 for presenting images. In this example, the beams 8 from each of three light-emitting diodes 3 are restricted to a second opening angle 9 using a collimation lens 15 and are directed onto a lens array 13 having lens elements 14. The lens element 14 of the lens array 13 can also have a size, for example, of 378 μm×378 μm. The lens array 13 of can consist, for example, of plastics, polycarbonate, epoxy resin, silicone, PMMA or glass. The collimation lenses 15 can likewise consist of plastics, polycarbonate, epoxy resin, silicone, PMMA or glass.

Figure 8:
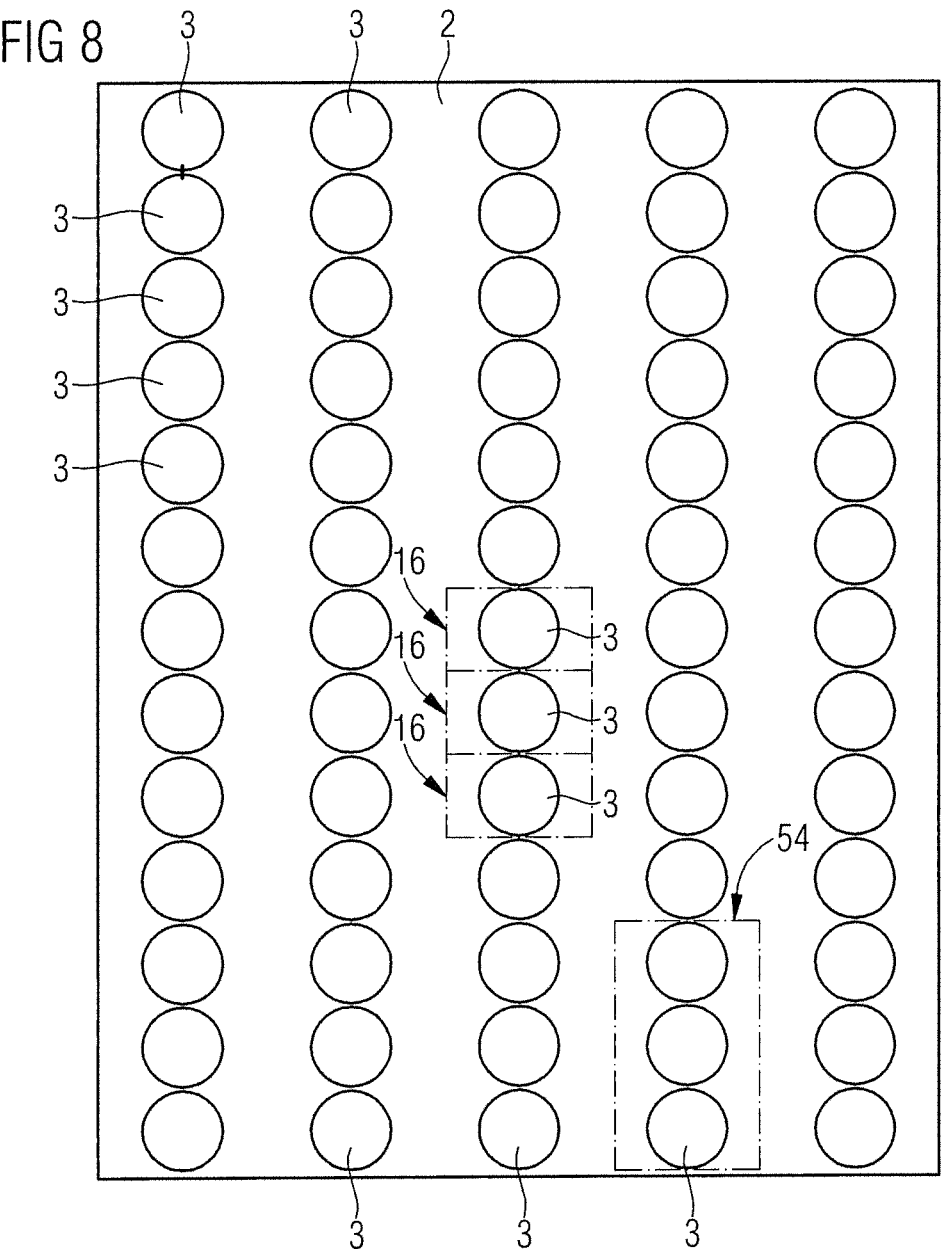
FIG. 8 shows a schematic plan view of an array of light-emitting diodes with a schematic illustration of a collimation lens.

FIG. 8 shows a schematic illustration of a plan view of a detail of the array 2 of the light-emitting diodes 3 arranged in rows and columns. This illustration schematically illustrates by way of three first frames 16 the association of the collimation lenses 15 with the light-emitting diodes 3 for one example. The first frame 16 comprises the number of light-emitting diodes 3 whose beam 8 is imaged by a collimation lens 15. The first frame 16 comprises in each case one light-emitting diode 3, as illustrated, e.g., in FIG. 4. A second frame 54 is illustrated in a bottom region of the array 2. The second frame 54 comprises three light-emitting diodes 3 imaged by a collimation lens 15, as illustrated, e.g., in FIG. 7. As has already been explained, a collimation lens 15 can be associated with at least one or more light-emitting diodes 3.

Figure 9:
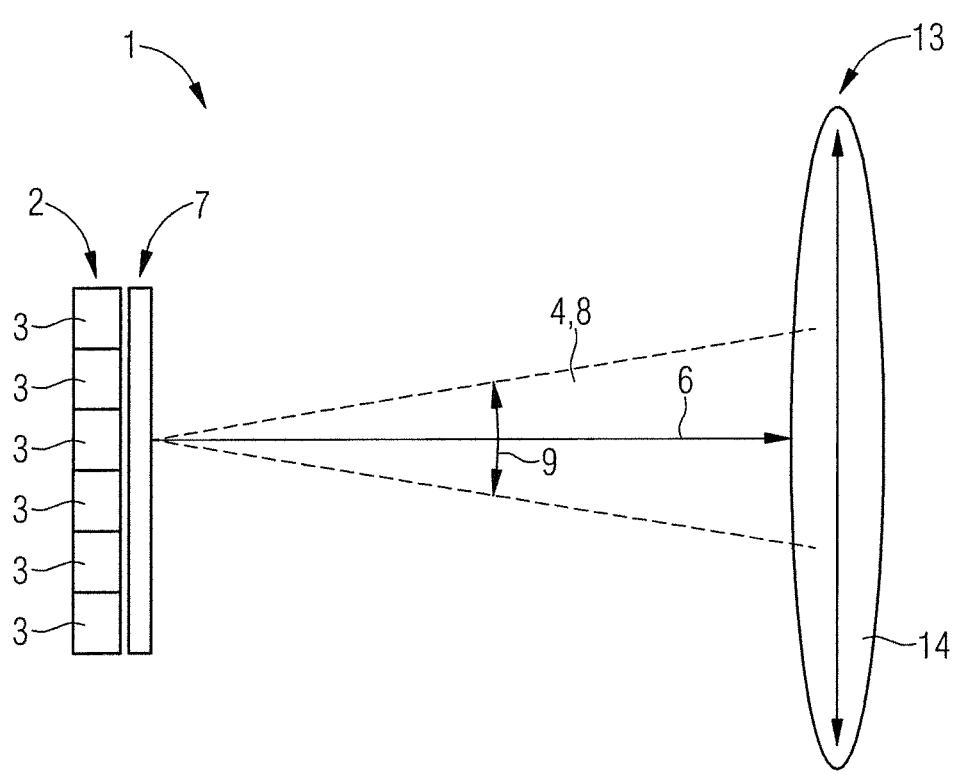
FIG. 9 shows a schematic side illustration of a detail of an apparatus for presenting an image with a further collimation apparatus.

FIG. 9 shows a schematic segment of a further apparatus 1 for presenting an image, having an array 2 of a plurality of light-emitting diodes 3, a collimation apparatus 7, a beam 8 from a light-emitting diode 3 having a second opening angle 9, wherein the beam 8 is directed in the emission direction 6 onto a lens element 14 of a lens array 13. In this example, one lens element 14 of the lens array 13 is also provided for a plurality of light-emitting diodes 3, in particular for a plurality of light-emitting pixels 12 having a plurality of light-emitting diodes 3. By way of example, the lens element 14 is provided for 12×12 light-emitting pixels 12, wherein each light-emitting pixel 12 has at least two, in particular three light-emitting diodes 3. A light-emitting pixel 12 can have, for example, an area of 31.5 μm×31.5 μm. A light-emitting diode 3 can have, for example, an area of 10.5 μm×31.5 μm.

Neighboring light-emitting diodes 3 in an array 2 can be arranged in a grid having identical spacings. Neighboring light-emitting diodes 3 of an array 2 can also be arranged in a grid having different spacings. Light-emitting diodes 3 of an array 2 can furthermore be arranged in a random arrangement having different spacings.

The light-emitting diodes 3 of an array 2 may be arranged in a grid and the spacings between neighboring light-emitting diodes 3 are of the same size in a central region of the array 2. The light-emitting diodes 3 additionally have a smaller spacing in the central region than in a surrounding region, which surrounds the central region. In the surrounding region, the spacings between neighboring light-emitting diodes 3 are of the same size. The spacings between two neighboring light-emitting diodes 3 in the surrounding region can be greater than the spacings between neighboring light-emitting diodes in the central region, e.g., by 10% or by 50% or even by 100%. In addition, an outer edge region can surround the surrounding region, wherein the spacings between neighboring light-emitting diodes in the outer edge region are greater than the spacings between neighboring light-emitting diodes in the surrounding region, e.g., by 10% or by 50% or even by 100%. The edge region can also be omitted.

The central region can be arranged concentrically around a center point of the array 2 and can extend over 10% or over 20% or more of the width and the length of the array 2. The edge region can encircle it in the shape of a ring and extend over up to 10% of the length and of the width of the array 2 starting from outer side edges of the array 2. The central region can have, e.g., the shape of an area of a circle, the shape of a rounded area of a circle or the shape of an area of a rectangle. The central region, the surrounding region and/or the outer edge region can also have different sizes and/or shapes.

In addition, the spacings between neighboring light-emitting diodes 3 can also vary within the central region and/or within the surrounding region and/or within the edge region. For example, an average spacing between neighboring light-emitting diodes in the surrounding region can be greater than an average spacing between neighboring light-emitting diodes in the central region, e.g., by 10% or by 50% or even by 100%. In addition, an average spacing between neighboring light-emitting diodes in the outer edge region can be greater than the average spacing between neighboring light-emitting diodes in the surrounding region, e.g., by 10% or by 50% or even by 100%.

For example, a plurality of arrays 2 of light-emitting diodes 3 can also be provided. In the array 2, neighboring light-emitting diodes 3 can have a constant spacing or varying spacings across the entire array 2. The arrays 2 can be arranged in a grid having equal spacings between neighboring arrays or having different spacings between neighboring arrays.

For example, the spacings between neighboring arrays 2 are of equal size in a central region of the arrangement. The arrays 2 additionally have a smaller spacing in the central region of the arrangement than in a surrounding region that surrounds the central region. In the surrounding region, the spacings between neighboring arrays 2 are of the same size. The spacings between the arrays in the surrounding region can be greater than the spacings between neighboring arrays in the central region, e.g., by 10% or by 50% or even by 100%. In addition, an outer edge region can surround the surrounding region, wherein the spacings between neighboring arrays in the outer edge region are greater than the spacings between neighboring arrays in the surrounding region, e.g., by 10% or by 50% or by 100% or more. The edge region can also be omitted. The central region can be arranged concentrically around a center point of the array 2 and can extend over 10% or over 20% of the width and the length of the array 2. The edge region can encircle it in the shape of a ring and extend over 10% or over 20% of the length and of the width of the array 2 starting from outer side edges of the array 2. The central region can have, e.g., the shape of an area of a circle, the shape of a rounded area of a circle or the shape of an area of a rectangle. The central region, the surrounding region and/or the outer edge region can also have different sizes and/or shapes.

In addition, the spacings between neighboring arrays 2 can also vary within the central region and/or within the surrounding region and/or within the edge region. For example, an average spacing between neighboring arrays in the surrounding region can be greater than an average spacing between neighboring arrays in the central region, e.g., by 10% or by 50% or by 100% or more. In addition, an average spacing between neighboring arrays in the outer edge region can be greater than the average spacing between neighboring arrays in the surrounding region, e.g., by 10% or by 50% or by 100% or more.

Figure 10:
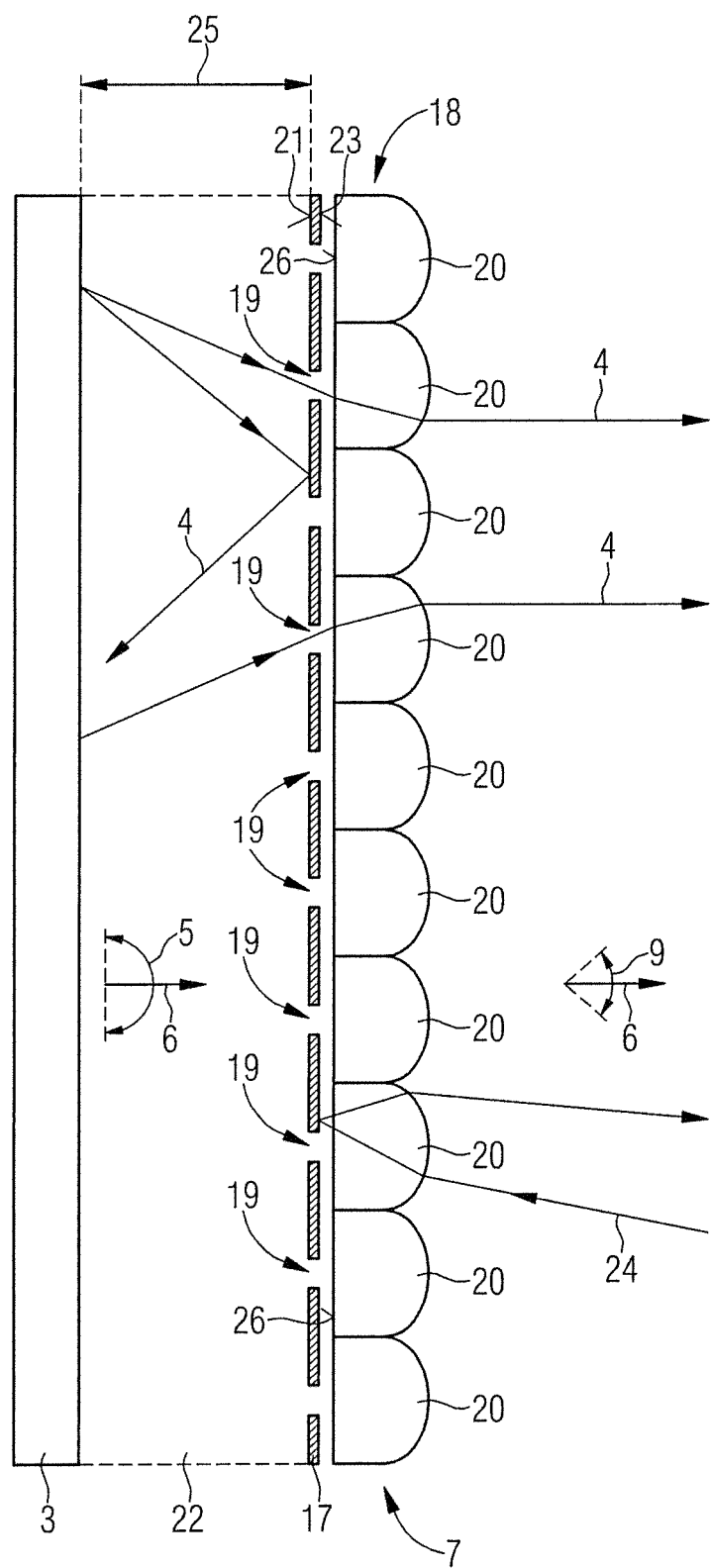
FIG. 10 shows an enlarged illustration of a segment of the apparatus of FIG. 9 with a collimation apparatus in the form of a pinhole plate and a sub-lens array.

FIG. 10 shows an enlarged segment of the apparatus 1 of FIG. 9. It schematically illustrates a light-emitting diode 3 of the array 2 in cross section. The light-emitting diode 3 can have, for example, an area of 10 μm×30 μm. Arranged downstream of the light-emitting diode 3 in the emission direction 6 is a collimation apparatus 7 in the form of a pinhole plate 17 and of a sub-lens array 18. The sub-lens array 18 is arranged in the illustrated example on an emission side of the pinhole plate 17. The pinhole plate 17 is arranged between the sub-lens array 18 and the light-emitting diode 3. The pinhole plate 17 has a multiplicity of holes 19. The holes 19 have a defined diameter and are, for example, a circular area in cross section. Owing to the holes 19, the electromagnetic rays 4 from the light-emitting diodes 3 can be output downstream of the pinhole plate 17 in the emission direction only in a desired angular range, in particular with second opening angles 9. The angular range, and in particular the second opening angle 9, is additionally influenced by the sub-lens array 18. In the illustrated example, the sub-lens array 18 has a multiplicity of sub-lenses 20, each sub-lens 20 is arranged over a respective hole 19 in the pinhole plate 17. The pinhole plate 17 can be reflective, or mirroring, on an incidence side 21, which faces the light-emitting diode 3. In this way, electromagnetic radiation 4 that is incident on the incidence side 21 of the pinhole plate 17 can be reflected back to the light-emitting diode 3.

A further material 22 can be provided between the light-emitting diode 3 and the pinhole plate 17. In this case, the optical refractive index of the sub-lens array 18 can be greater than the optical refractive index of the further material 22. The further material 22 is formed from a material transparent for the electromagnetic radiation 4 from the light-emitting diodes 3 of the array 2. For example, the further material 22 can be in the form of silicone.

The pinhole plate 17 can be reflective or scattering on an emission side 23 arranged to face away from the array 2. As a result, external electromagnetic radiation 24 incident on the emission side 23 of the pinhole plate 17 can be reflected back or scattered. The reflectance of the pinhole plate 17 on the incidence side 21 and/or on the emission side 23 is, for example, at least 50%, in particular at least 80%, of the incident electromagnetic radiation.

The pinhole plate 17 may have a spacing 25 from the light-emitting diode 3 that is smaller than an edge length of a light-emitting diode 3. The edge length of the light-emitting diode 3 can be, e.g., 0.5 μm to 100 μm, in particular 10 μm to 30 μm. The pinhole plate may have a spacing from the light-emitting diodes that is shorter than an edge length of a light-emitting pixel. A light-emitting pixel comprises at least the light-emitting diodes required to present an image point of the presented image. A light-emitting pixel can have, for example, two light-emitting diodes, in particular three light-emitting diodes or even more light-emitting diodes.

The sub-lens array 18 can consist of a material having a refractive index, e.g., of 1.5 to 2. In particular, the further material 22 can have a refractive index of 1.3 to 1.5. The sub-lens array 18 can also be omitted. The sub-lens array 18 has sub-lenses 20 having, for example, the shape of a spherical cap, a cylinder segment or the like. The sub-lens array 18 can be used to effect pre-collimation with sub-lenses 20 that have, e.g., aspheric, coaxial spherical cap shapes. The sub-lens array 18 can additionally be rotated through 180° such that the spherical-cap-shaped surfaces of the sub-lens array 18 face the pinhole plate 17 and a planar side of the sub-lens array 18 is arranged to face away from the pinhole plate 17. In the illustrated example, a planar side 26 of the sub-lens array 18 faces the pinhole plate 17.

The sub-lens array 18 can furthermore also be arranged on the incidence side 21 of the pinhole plate 17. In addition, each one sub-lens array 18 can be arranged on both sides of the pinhole plate 17.

In an example without a sub-lens array 18, the pinhole plate 17 is configured such that the radiation 4 from the light-emitting diodes 3 is reduced from the first opening angle 5 to the smaller second opening angle 9. The first opening angle of the light-emitting diodes 3 can be up to 180°, i.e., +90° and −90° with respect to the emission direction 6. After the pinhole plate 17, the second opening angle 9 is, for example, +45° and −45° with respect to the emission direction 6. The second opening angle 9 can also be smaller or greater.

In an example with at least one sub-lens array 18, the pinhole plate 17 and the at least one sub-lens array 18 are configured such that the radiation from the light-emitting diodes 3 is reduced from the first opening angle 5 to the smaller second opening angle 9. The first opening angle of the light-emitting diodes 3 can be up to 180°, i.e., +90° and −90° with respect to the emission direction 6. After the pinhole plate 17 and the sub-lens array 18, the second opening angle 9 is, for example, +45° and −45° with respect to the emission direction 6. The second opening angle 9 can also be smaller or greater.

The sub-lens array 18 can also have optical elements in the form of planoconvex converging lenses. The sub-lenses here are respectively convex on an outer side and respectively planar on an inner side. The convex sides of the sub-lenses can be, for example, spherical or aspheric. It is additionally possible for the sub-lenses to be conical, biconical, toroidal or to have a different shape. The sub-lenses 20 of the sub-lens array 18, for example, contiguously connect to one another in one piece. The sub-lenses are here arranged one next to the other in a regular grid arrangement. The grid arrangement, for example, corresponds to the arrangement of the holes 19 in the pinhole plate 17. The pinhole plate 17 has the shape of a flat plate and is arranged substantially parallel to an emission side of the light-emitting diodes 3 of the array 2, i.e., perpendicular to the emission direction 6. The pinhole plate 17 can be laminated on or can be applied as a metallization to the sub-lens array 18 or a different transparent carrier. The pinhole plate 17 can be produced using a white ink. The holes 19 in cross section can have, for example, round or rectangular cross sections. The diameter of the holes 19 can in one example be smaller than an edge length of a light-emitting diode 3 by at least by 50% or by 90%. In addition, the holes can be even smaller, but also larger.

Figure 11:
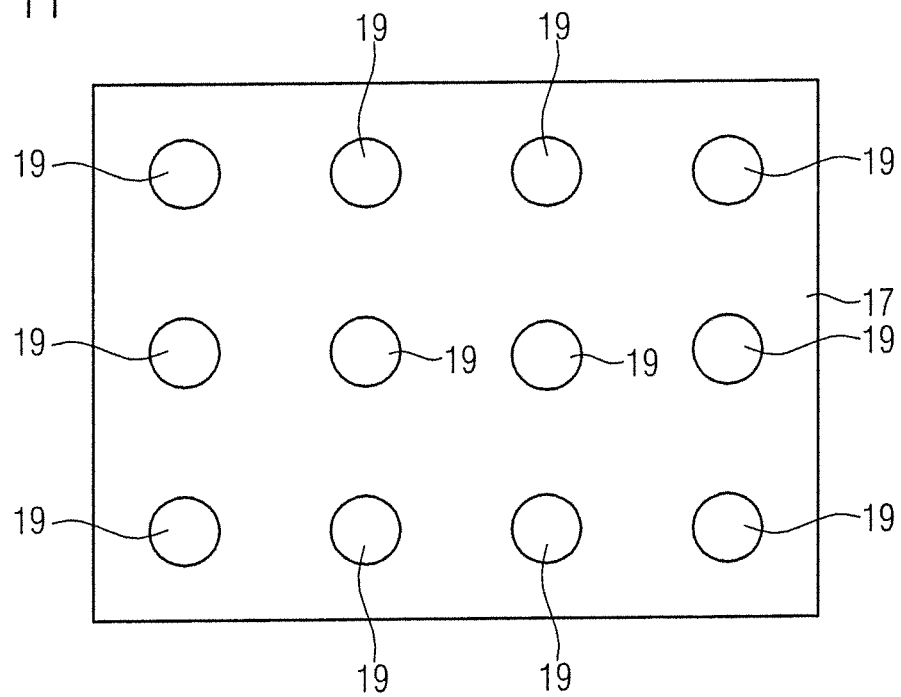
FIG. 11 shows a schematic plan view of an incidence side of the pinhole plate of FIG. 10.

FIG. 11 shows a schematic illustration of a segment of the pinhole plate 17 with the holes 19.

Figure 12:
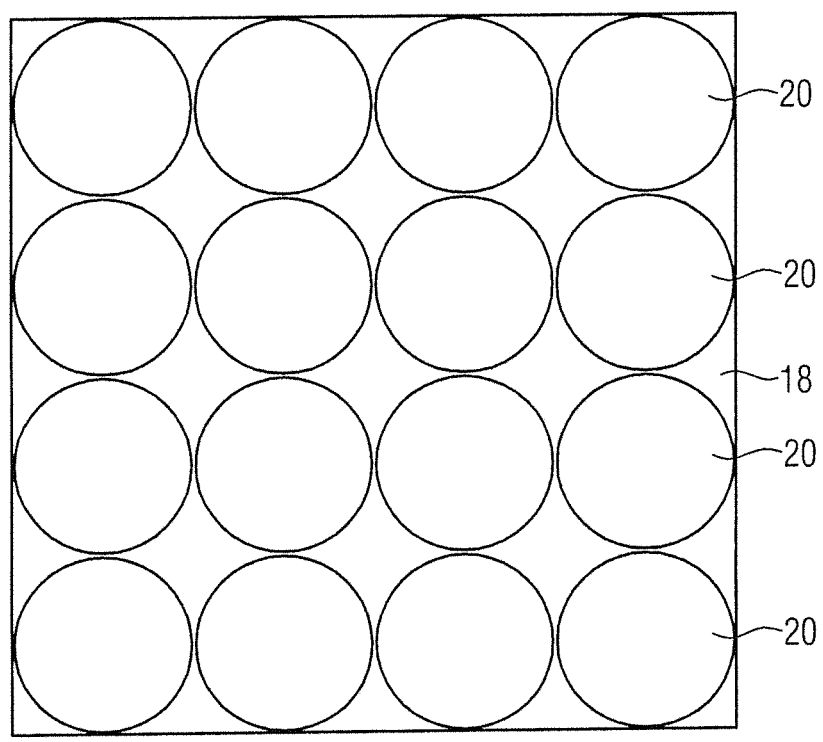
FIG. 12 shows a schematic plan view of the sub-lens array of FIG. 10.

FIG. 12 shows a schematic illustration of a plan view of the sub-lens array 18 with the sub-lenses 20.

FIG. 13 shows a schematic illustration of an example of a collimation apparatus 7 substantially in accordance with the collimation apparatus 7 of FIG. 10, but wherein, in addition to the sub-lens array 18 on the emission side 23 of the pinhole plate 17, a second sub-lens array 27 is provided on the incidence side 21 of the pinhole plate 17. In the illustrated example, the second sub-lens array 27 is arranged in identical fashion to the sub-lens array 18. The sub-lenses 20 of the second sub-lens array 27 are in the form of lenses. One sub-lens 20 is associated with each respective hole 19. The sub-lenses 20 of the second sub-lens array 27 direct electromagnetic radiation 4 into the holes 19. For example, the sub-lenses 20 of the second sub-lens array 27 represent converging lenses that are in particular planoconvex converging lenses. The arrangement of the sub-lens array 18 on the emission side 23 of the pinhole plate 17 can also be omitted. The two sub-lens arrays 18, 27, or only one of the two sub-lens arrays, can also be arranged such that the planar side faces away from the pinhole plate.

FIG. 14 shows a further example of a collimation apparatus 7 with a pinhole plate 17 having holes 19. In this example, an optical taper layer 28 is formed on the emission side 23 of the pinhole plate 17. The taper layer 28 has optical tapers 29. The optical tapers 29 can also be referred to as reflectors. Starting from an inner side 30 facing the pinhole plate 17, each optical taper 29 widens in the emission direction toward the outer side 32 of the optical taper layer 28. Each optical taper 29 here has an outer face 31 that extends from the inner side 30 to an outer side 32 of the taper layer 28. The outer face 31 forms a lateral surface of the conically widening optical taper 29. Electromagnetic radiation passing through a hole 19 in the pinhole plate 17 into the taper layer 28 is reflected by total internal reflection within the outer face 31 of the optical taper 29 and thereby guided to the outer side 32 of the taper layer 28.

FIG. 15 shows a further example of a collimation apparatus 7 with a pinhole plate 17 having holes 19. An optical taper layer 28 is arranged on an emission side 23 of the pinhole plate 17. A reflective material is formed on outer faces 31 of the optical tapers 29. Electromagnetic radiation that passes through the holes 19 in the pinhole plate 17 into the taper layer 28 is reflected at the cylinder cones 33, which are formed between the individual optical tapers 29, and directed in the direction of the outer side 32 of the taper layer 28. The cylinder cones 33 thus delimit the optical tapers 29.

Figure 16:
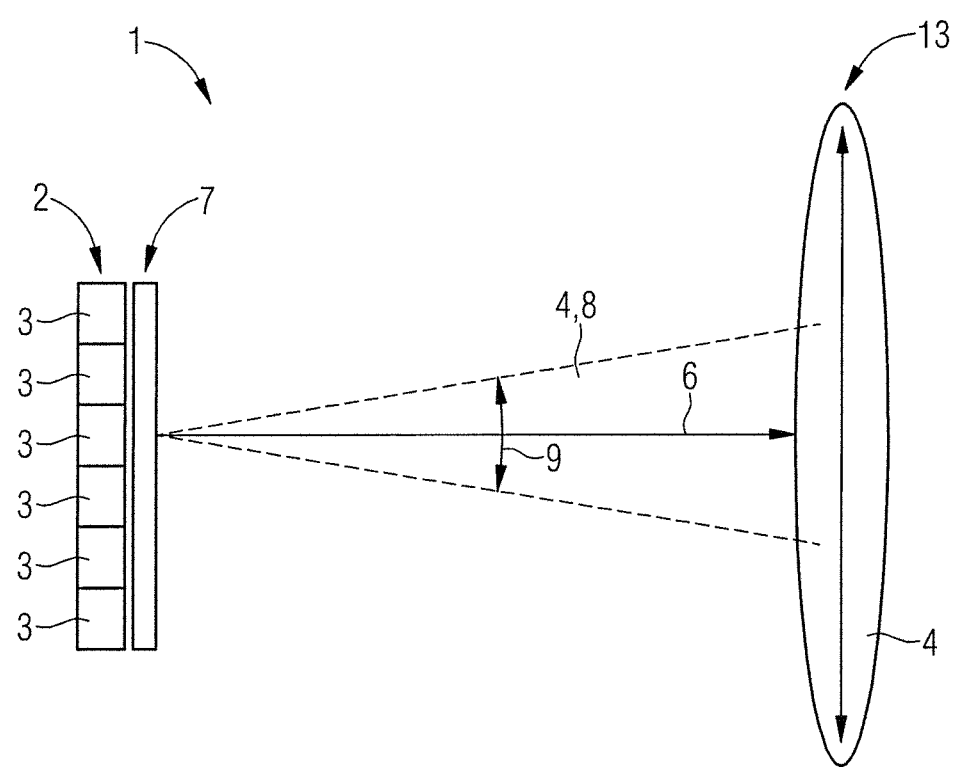
FIG. 16 shows a schematic segment of a further example of an apparatus for presenting an image.

FIG. 16 shows a schematic illustration of a detail of a further example of an apparatus 1 for presenting an image. Illustrated are a detail of an array 2 of light-emitting diodes 3, a collimation apparatus 7 and a lens element 14 of a lens array 13.

Figure 17:
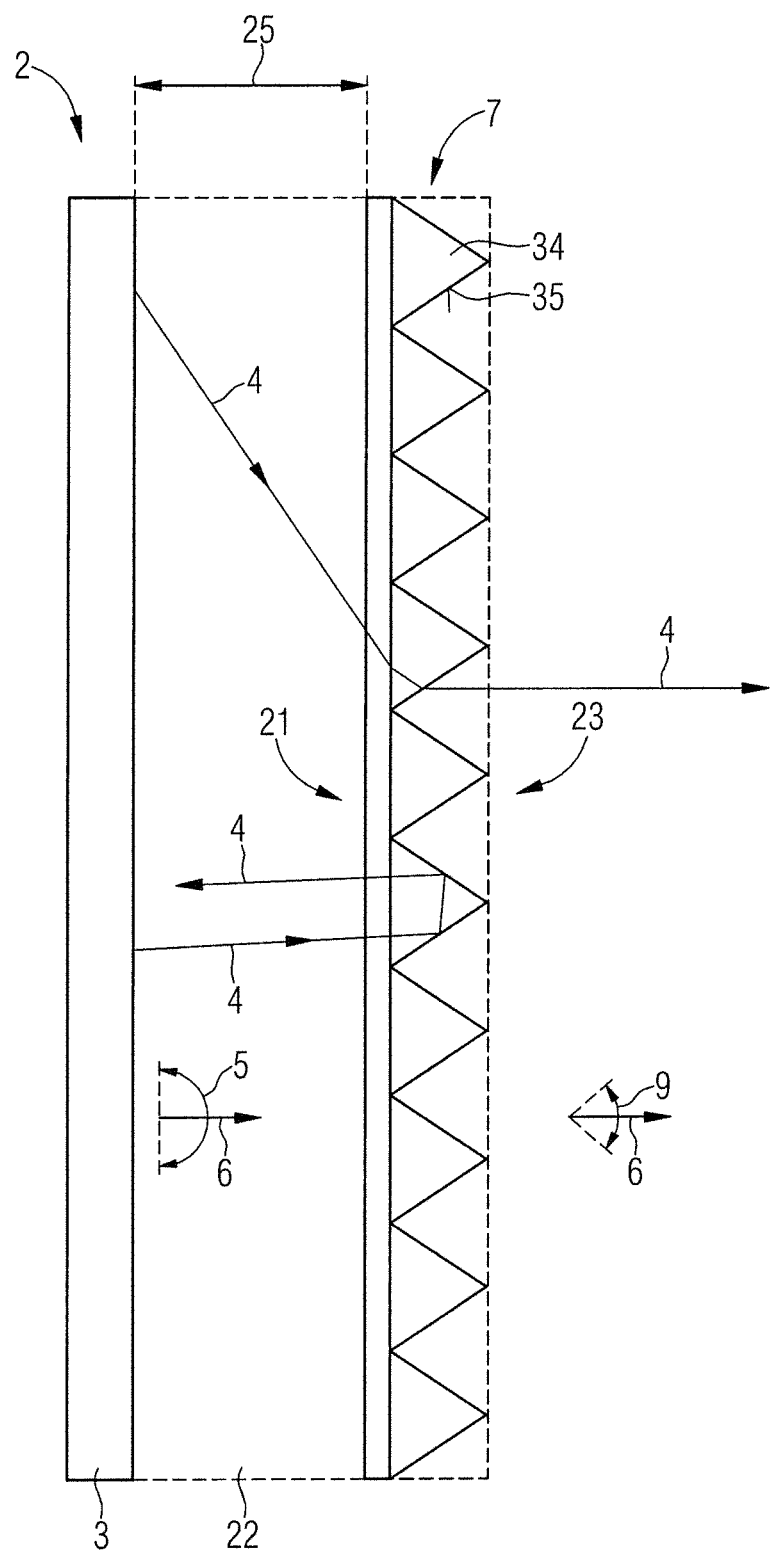
FIG. 17 shows an enlarged segment of the apparatus of FIG. 16 with a collimation apparatus in the form of an optical filter element having a structured surface.

FIG. 17 shows part of the apparatus 1 of FIG. 16 with an enlarged segment of the array 2 with an illustration of a light-emitting diode 3 and of a detail of the collimation apparatus 7. The collimation apparatus 7 in this example is in the form of an optical filter element 34, wherein the filter element 34 has a structured surface 35 on an emission side 23.

The filter element 34 with the structured surface 35 restricts the radiation of the light-emitting diodes 3 from the first opening angle 5 to the smaller second opening angle 9. The first opening angle of the light-emitting diodes 3 can be up to 180°, i.e., +90° and −90° with respect to the emission direction 6. After the filter element 34 with the structured surface 35, the second opening angle 9 is, for example, +/−45° with respect to the emission direction 6. The second opening angle 9 can also be smaller or greater.

The structured surface 35 can, e.g., transmit electromagnetic radiation 4 only in a specified angle of incidence range via total internal reflection at the surfaces of the structured surface 35. The structured surface 35 can, for example, transmit electromagnetic radiation with a specified angle of incidence, wherein the faces are arranged between 30° and 55° with respect to a surface normal of the emission side 23 of the filter element 34.

For example, the filter element can transmit more than 50%, in particular more than 60%, of the electromagnetic radiation 4 incident on the filter element 34 in the specified angle of incidence range. The filter element 34 can transmit less than 50%, in particular less than 40%, of the electromagnetic radiation outside the specified angle of incidence range. The surface 35 of the filter element 34 can have, on the emission side 21, for example, pyramids, prisms, conical arrays, crossed prisms or other structures. The filter element 34 can consist of an optically transparent material, in particular glass, plastics, epoxy resin and the like.

A further material 22 in the form of a layer can be arranged between an incidence side 21 of the filter element 34 and the light-emitting diode 3. The further material 22 is formed from a material transparent for the electromagnetic radiation from the light-emitting diode 3. For example, the refractive index of the filter element 34 can be greater than the refractive index of the further material 22. In addition, the surface 35 of the filter element 34 can be provided with a planarization layer 36. The planarization layer 36 is schematically illustrated in the form of a dashed line. By providing the planarization layer 36, the structured surface 35 is protected. In addition, dirt deposits on the planarized surface 35 are reduced hereby.

The structured surface 35 of the filter element 34 can be in the form of planar faces arranged in an angular range between 40° and 80° with respect to a surface normal of the emission side 23 of the filter element 34. The structured surface 35 can also be in the form of a roughened surface. The roughened surface can have, in a tactile measurement, an average roughness of 0.1 µm to 10 µm. In particular, the roughness can be 0.1 to 1 µm, in particular in the region of 0.4 µm. The roughened surface can be produced by way a grinding process or a particle blasting process. The structured faces, or the pyramid faces, the prism faces, the cone faces, the crossed prisms, can be arranged in a periodic grid or with random distribution. In addition, the faces can comprise a wide variety of structured faces which are arranged in an angular range between 40° and 80°, in particular in an angular range between 50° and 75°, with respect to a surface normal of the emission side 23 of the filter element 34. The structured surface 35 can in addition have structured faces in the form of planar faces, wherein the planar faces are arranged in an angular range between 40° and 80° with respect to a surface normal of the emission side 23 of the filter element 34, wherein the planar faces are additionally roughened. In that case, the planar faces can have an average roughness of 0.1 µm to 10 µm.

The structured surface 35 can be, for example, in the form of a film or of a substrate. The filter element 34 can be formed from silicone, plastics, sapphire, glass or a transparent semiconductor material.

The filter element 34 may have a spacing 25 from the light-emitting diode 3 that is smaller than an edge length of a light-emitting diode 3. The edge length of the light-emitting diode 3 can be, e.g., 0.5 µm to 100 µm, in particular 10 µm to 30 µm. The filter element may have a spacing from the light-emitting diodes that is shorter than an edge length of a light-emitting pixel. A light-emitting pixel comprises at least the light-emitting diodes required to present an image point of the presented image. A light-emitting pixel can have, for example, two light-emitting diodes, in particular three light-emitting diodes or even more light-emitting diodes.

Figure 18:
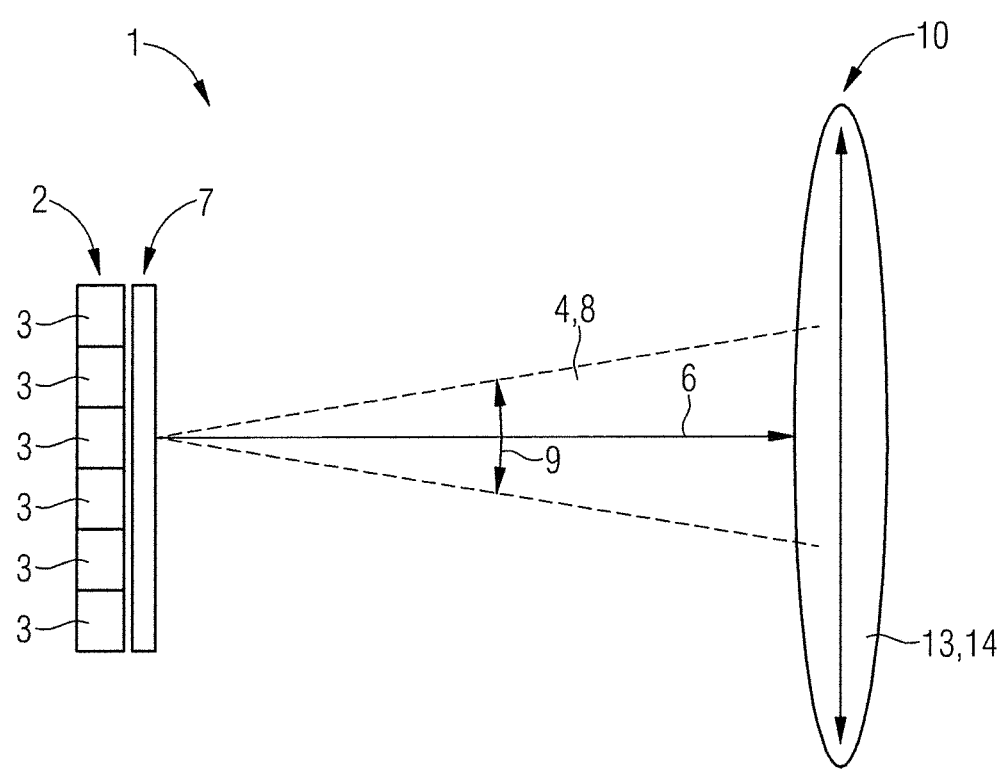
FIG. 18 shows a schematic partial cross section of a further example of an apparatus for presenting an image.

FIG. 18 shows a schematic partial view of a further example of an apparatus 1 for presenting images, having an array 2, a collimation apparatus 7 and an optical imaging apparatus 10, which is in the form of a lens array 13 having a lens element 14.

Figure 19:
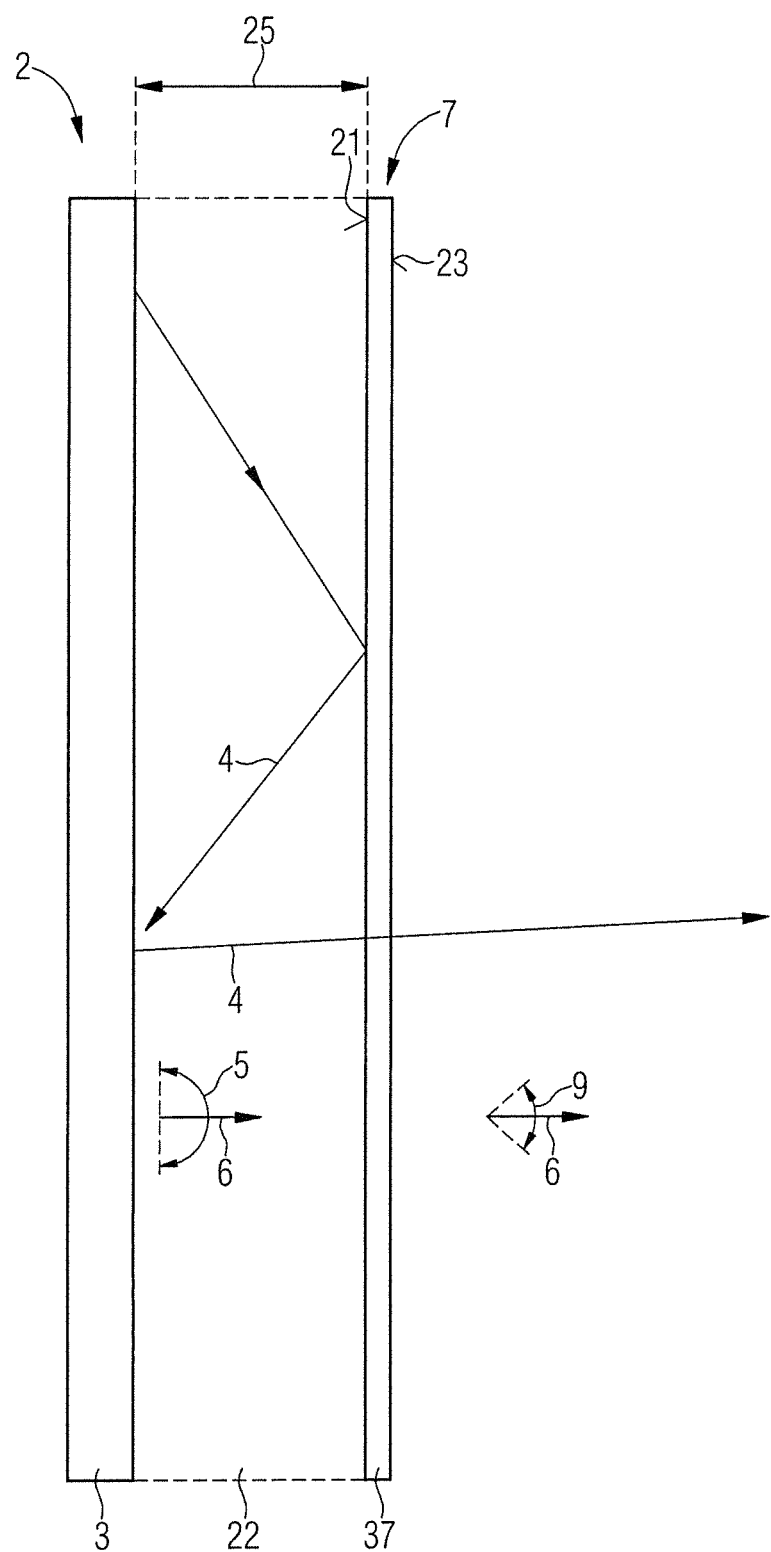
FIG. 19 shows an enlarged illustration of a segment of FIG. 18 with a collimation apparatus in the form of an optical filter element in the form of mirror layers.

FIG. 19 shows an enlarged schematic illustration of a detail of the apparatus of FIG. 18. Illustrated are a light-emitting diode 3 and a collimation apparatus 7 in the form of a mirror 37. The mirror 37 transmits electromagnetic radiation 4 from the light-emitting diodes 3 only in a specified angular range, in particular with a second opening angle 9. As a result, radiation from the light-emitting diodes 3 is reduced from the first opening angle 5 downstream of the mirror 37 in the emission direction 6 to the smaller second opening angle 9 downstream of the mirror 37 in the emission direction 6 by way of the mirror 37. The first opening angle of the light-emitting diodes 3 can be up to 180°, i.e., +/−90° with respect to the emission direction 6. After the mirror 37, the second opening angle 9 is, for example, +/−45° with respect to the emission direction 6. The second opening angle 9 can also be smaller or greater.

For example, the mirror 37 can reflect electromagnetic radiation 4 incident on an incidence side 21 of the mirror 37 at an angle of incidence smaller than a specified angular range. For example, the angular range from which reflection increases, in particular total internal reflection occurs, can range. e.g., between 0° and 45° with respect to the plane of the incidence side 21 of the mirror 37.

The mirror 37 can be formed, for example, in the form of dielectric layers. The mirror 37 can also be a photonic crystal. Photonic crystals consist, e.g., of structured semiconductors, glasses or polymers. Photonic crystals, e.g., guide light onto dimensions that can be of the order of magnitude of the wavelength. In addition, photonic crystals can transmit light only in a specified angular range. Photonic crystals can have periodic dielectric structures, the period lengths of which are set such that they influence the propagation of electromagnetic waves in a desired manner.

In particular, it is possible to use various dielectric layers for light-emitting diodes 3 with different wavelength spectra. Hereby improved adaptation of the reflectance to the wavelength spectrum of the light-emitting diodes can be achieved. For example, the dielectric layers of the mirror 37 can be formed such that reflection occurs when the electromagnetic radiation 4 is incident on the incidence side 21 of the mirror 37 at an angle of less than 45°. Consequently, the dielectric layers of the mirror 37 are formed such that the electromagnetic radiation 4 passes through the mirror 37 when the electromagnetic radiation 4 is incident on the incidence side 21 of the mirror 37 at an angle of between 45° and 135°. The electromagnetic radiation 4 reflected by the mirror 37 can be reflected, or absorbed, and re-emitted by the array 2.

The mirror 37 may have a spacing 25 from the light-emitting diode 3 smaller than an edge length of a light-emitting diode 3. The edge length of the light-emitting diode 3 can be, e.g., 0.5 µm to 100 µm, in particular 10 µm to 30 µm. The mirror may have a spacing from the light-emitting diodes shorter than an edge length of a light-emitting pixel. A light-emitting pixel comprises at least the light-emitting diodes required to present an image point of the presented image. A light-emitting pixel can have, for example, two light-emitting diodes, in particular three light-emitting diodes or even more light-emitting diodes.

Figure 20:
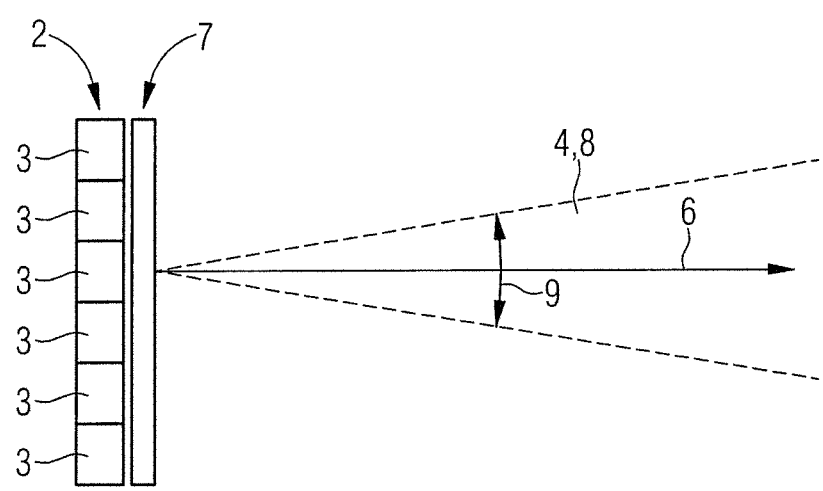
FIG. 20 shows a schematic segment of a further example of an apparatus for presenting an image.

FIG. 20 shows a schematic illustration of a segment of a further example of an apparatus 1 for presenting an image. Illustrated here are an array 2 of light-emitting diodes 3 and a collimation apparatus 7.

Neighboring light-emitting diodes 3 can be arranged in a grid having identical spacings. Neighboring light-emitting diodes 3 can also be arranged in a grid having different spacings. Neighboring light-emitting diodes 3 can furthermore also be arranged in a random arrangement having different spacings.

For example, the spacings between neighboring light-emitting diodes 3 are of equal size in a central region of the array 2. Neighboring light-emitting diodes 3 additionally have a smaller spacing in the central region than in a surrounding region that surrounds the central region. In the surrounding region, the spacings between neighboring light-emitting diodes 3 are of the same size. The spacings between neighboring light-emitting diodes in the surrounding region can be greater than the spacings between the light-emitting diodes in the central region, e.g., by 10% or by 50% or by 100% or more. In addition, an outer edge region can surround the surrounding region, wherein the spacings between neighboring light-emitting diodes in the outer edge region are greater than the spacings between neighboring light-emitting diodes in the surrounding region, e.g., by 10% or by 50% or by 100% or more. The edge region can also be omitted. The central region can be arranged concentrically around a center point of the array 2 and can extend over 20% of the width and the length of the array 2. The edge region can encircle it in the shape of a ring and extend over 10% or over 20% of the length and of the width of the array 2 starting from outer side edges of the array 2. The central region can have, e.g., the shape of an area of a circle, the shape of a rounded area of a circle or the shape of an area of a rectangle. The central region, the surrounding region and/or the outer edge region can also have different sizes and/or shapes.

In addition, spacings between the light-emitting diodes 3 can also vary within the central region and/or within the surrounding region and/or within the edge region. For example, an average spacing between neighboring light-emitting diodes in the surrounding region can be greater than an average spacing between the light-emitting diodes in the central region, e.g., by 10% or by 50% or by 100% or more. In addition, an average spacing between neighboring light-emitting diodes in the outer edge region can be greater than the average spacing between neighboring light-emitting diodes in the surrounding region, e.g., by 10% or by 50% or by 100% or more.

For example, it is also possible for a plurality of arrays 2 of light-emitting diodes 3 to be provided, wherein the arrays 2 are arranged in a grid having identical or having different spacings. For example, the arrays 2 are arranged in a grid and the spacings between neighboring arrays 2 are of the same size in a central region of the arrangement. Neighboring arrays 2 additionally have a smaller spacing in the central region than in a surrounding region that surrounds the central region. In the surrounding region, the spacings between neighboring arrays 2 are of the same size. The spacings between the arrays in the surrounding region can be greater than the spacings between neighboring arrays in the central region, e.g., by 10% or by 50% or by 100% or more. In addition, an outer edge region can surround the surrounding region, wherein the spacings between neighboring arrays in the outer edge region are greater than the spacings between neighboring arrays in the surrounding region, e.g., by 10% or by 50% or by 100% or more. The edge region can also be omitted. The central region can be arranged concentrically around a center point of the array 2 and can extend over 20% of the width and the length of the array 2. The edge region can encircle it in the shape of a ring and extend over 10% or 20% of the length and of the width of the array 2 starting from outer side edges of the array 2. The central region can have, e.g., the shape of an area of a circle, the shape of a rounded area of a circle or the shape of an area of a rectangle. The central region, the surrounding region and/or the outer edge region can also have different sizes and/or shapes.

In addition, the spacings between neighboring arrays 2 can also vary within the central region and/or within the surrounding region and/or within the edge region. For example, an average spacing between neighboring arrays in the surrounding region can be greater than an average spacing between neighboring arrays in the central region, e.g., by 10% or by 50% or by 100% or more. In addition, an average spacing between neighboring arrays in the outer edge region can be greater than the average spacing between neighboring arrays in the surrounding region, e.g., by 10% or by 50% or by 100% or more.

Figure 21:
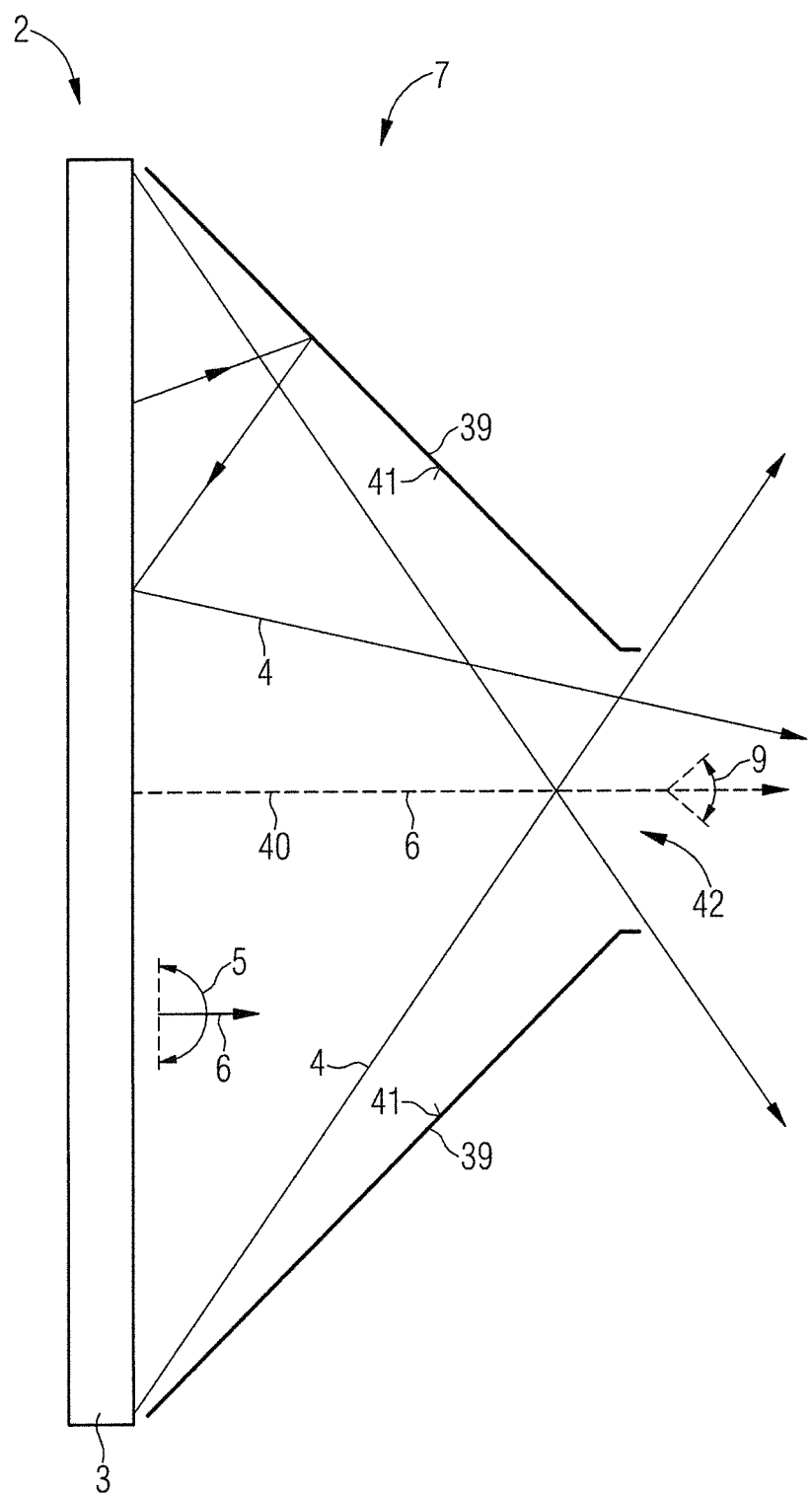
FIG. 21 shows a schematic enlarged segment of the arrangement of FIG. 20.

FIG. 21 shows an enlarged schematic illustration of a detail of the apparatus 1 of FIG. 20. It illustrates a light-emitting diode 3 of the array 2. In this example, the collimation apparatus 7 is in the form of reflection structures 39 arranged downstream of the array in the emission direction 6. The reflection structures 39 have a cross section perpendicular to the emission direction 6 that tapers in the emission direction 6 of the electromagnetic radiation 4 from the light-emitting diodes 3 to an emission opening 42. The collimation apparatus 7 has a multiplicity of reflection structures 39 arranged next to one another, in one plane. FIG. 21 illustrates only one reflection structure 39.

For example, the reflection structure 39 can be a cylinder cone or a pyramid cone. The reflection structure 39 in particular exhibits a rotational symmetry with respect to a central axis 40, wherein the central axis 40 can be perpendicular to the array 2. The reflection structure 39 is reflective or scattering on an inner side 41 of the reflection structure 39. Electromagnetic radiation 4 emitted by the light-emitting diode 3 is either emitted directly via the emission opening 42 or, upon incidence on the inner side 41 of the reflection structure 39, is reflected back and subsequently directed back again in the direction of the emission opening 42 via a further reflection. To this end, the light-emitting diode 3 can likewise be reflective on the emission side and have, for example, a mirror layer.

The reflection structure 39 restricts the radiation 4 of the light-emitting diodes 3 from the first opening angle 5 downstream of the reflection structure 39 in the emission direction 6 to the smaller second opening angle 9 downstream of the reflection structure 39 in the emission direction 6. The first opening angle of the light-emitting diodes 3 can be up to 180°, i.e., +/−90° with respect to the emission direction 6. After the reflection structure 39, the second opening angle 9 is, for example, +/−45° with respect to the emission direction 6. The second opening angle 9 can also be smaller or greater.

Figure 22:
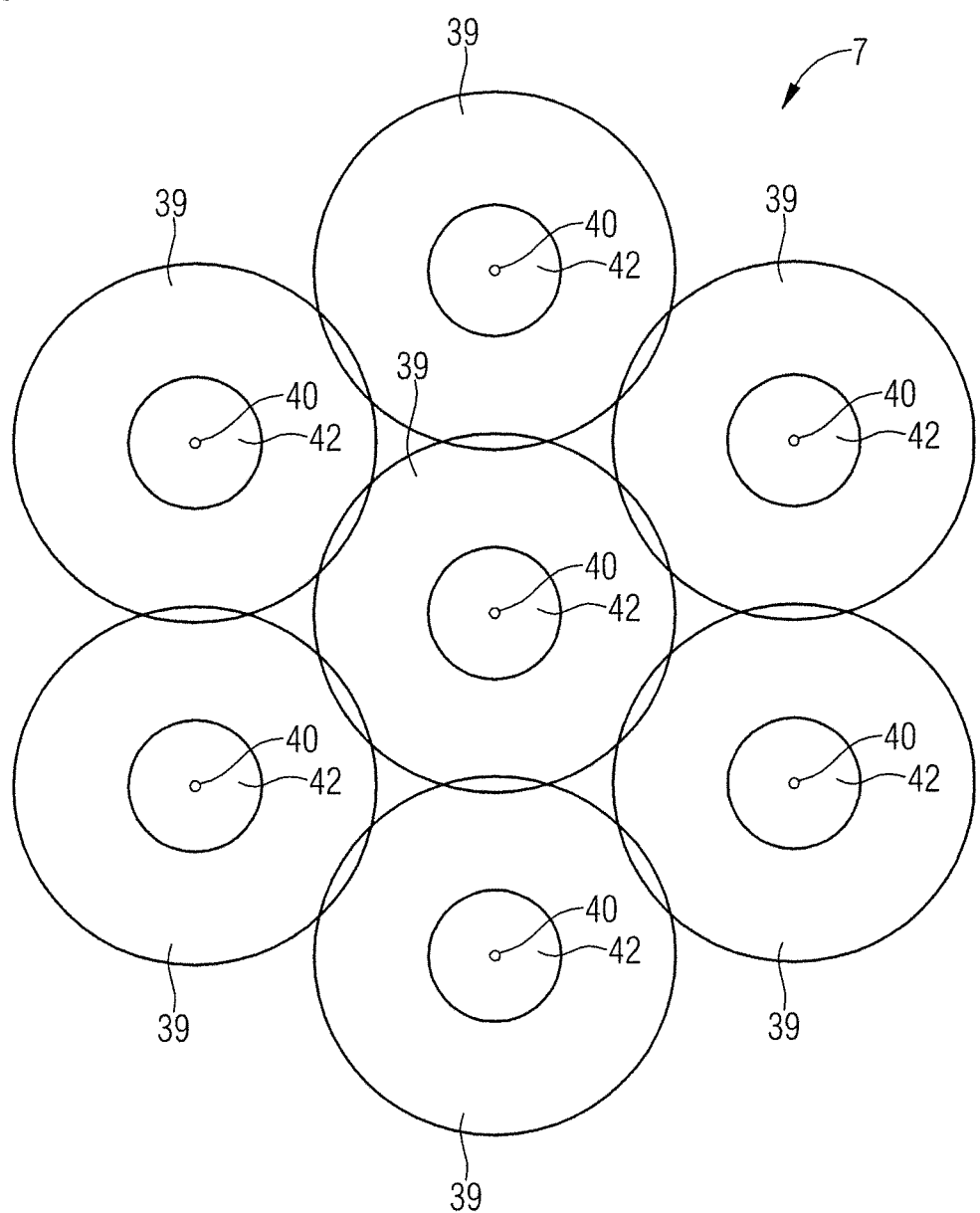
FIG. 22 shows a schematic plan view of the reflection structure of FIG. 21.

FIG. 22 shows a schematic plan view of part of the collimation apparatus 7 of FIG. 20 having a plurality of reflection structures 39. The reflection structures 39 can also have other cross sections and/or shapes. It is a function of the reflection structure 39 to reduce the opening angle of the beams of the light-emitting diodes from the first opening angle to the smaller second opening angle.

In addition, relatively good light output and efficiency is achieved due to the reflective inner side 41 of the reflection structures 39. The emission opening 42 has a smaller area than an incidence opening of the reflection structure 39. Hereby, a reduction in the opening angle of the emission angle is achieved. For example, the incidence opening of the reflection structure can be in the region of 10 μm×10 μm. The area of incidence and/or the emission area can represent a circular area or a rectangular area.

Figure 23:
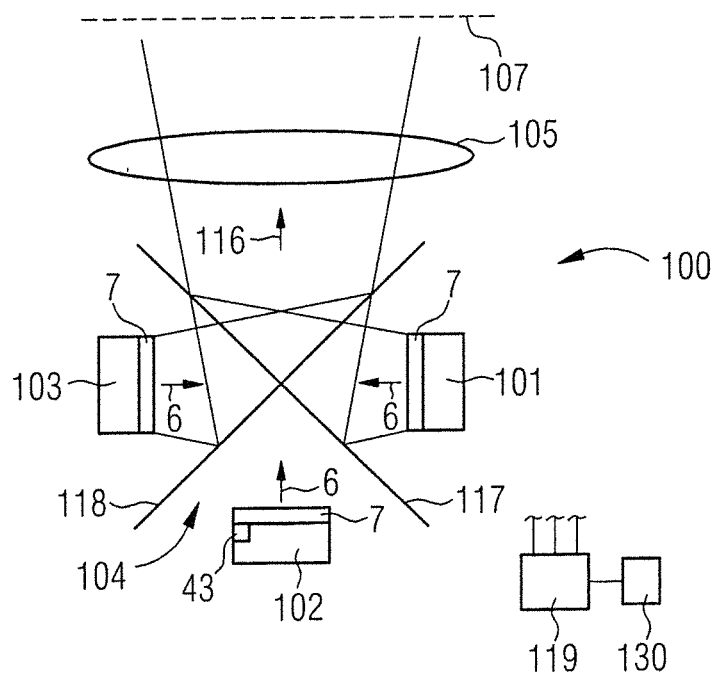
FIG. 23 shows a schematic illustration of an apparatus for presenting an image on a heads-up display.

FIG. 23 shows a schematic illustration of an apparatus 100 for presenting an image on a head-up display in an image plane 107. The apparatus 100 has a first, a second and a third array 101, 102, 103 of light-emitting diodes. Each of the arrays 101, 102, 103 can be in accordance with an example of the arrays 2 of the preceding examples with the corresponding collimation apparatuses 7. The optical imaging apparatuses 10, 13, 14 can be omitted. Each array 101, 102, 103 has light-emitting diodes individually actuable and that output electromagnetic radiation, that is to say light having different or having identical wavelengths.

For example, the first array 101 can output electromagnetic radiation having a first wavelength spectrum, for example, blue light. The second array 102 can furthermore output electromagnetic radiation having a second wavelength spectrum, for example, green light. In addition, the third array 103 can output electromagnetic radiation having a third wavelength spectrum, for example, red light. The first and the third array 101, 103 are arranged opposite one another. An emission direction 6 of the first and of the third array 101, 103 are parallel with respect to one another. Arranged below the first and the third array 101, 103 is the second array 102. The second array 102 has an emission direction 6 substantially perpendicular to the emission directions 6 of the first and of the third array.

Provided between the arrays 101, 102, 103 is a combination optical unit 104. The combination optical unit 104 directs the electromagnetic rays from the three arrays 101, 102, 103 in an overall radiation direction 116 onto the image plane 107. Arranged in the image plane 107 is a display, for example, in the form of a diffusing screen. In the illustrated example, the overall radiation direction 116 is parallel to the emission direction 6 of the second array 102. The combination optical unit 104 is, for example, a double cube beam splitter. The double cube beam splitter has two crossed reflection planes 117, 118. The crossed reflection planes 117, 118 are illustrated schematically in the form of lines. The first and second reflection planes 117, 118 are perpendicular to one another. A point of intersection of the reflection planes 117, 118 is arranged centrally between the first and the third array 101, 103. In addition, the point of intersection of the reflection planes 117, 118 is arranged centrally with respect to the second array 102. The first reflection plane 117 is transmissive for the electromagnetic radiation of the third array 103. In addition, the first reflection plane 117 reflects the electromagnetic radiation of the first array 101 in the overall radiation direction 116. The second reflection plane 118 is transmissive for the electromagnetic radiation of the first array 101. In addition, the second reflection plane 118 deflects the electromagnetic radiation of the third array 103 in the overall radiation direction 116. The first and second reflection planes 117, 118 are furthermore transmissive for the electromagnetic radiation of the second array 102. In this way, superposition of the electromagnetic rays of the three arrays 101, 102, 103 in the overall radiation direction 116 is effected. In the illustrated example, a first imaging optical unit 105 is provided downstream of the combination optical unit 104 in the overall radiation direction 116. The first imaging optical unit 105 can be, for example, as a projection lens or a lens system, in particular a converging lens that focusses focusses the electromagnetic radiation of the three arrays 101, 102, 103 onto the image plane 107. It is also possible for a virtual image plane to be provided in place of the image plane 107. In addition, reflectors or reflector systems can be provided in all examples in place of the lenses or lens systems.

An LED 43 that emits infrared radiation can additionally be provided. For example, the LED 43 can be integrated in the second array 102 or be arranged next to the second array 102. In addition, a control circuit 119 is provided, which can connect to a memory 130. The control circuit 119 connects to the light-emitting diodes of the arrays such that the control circuit 119 can actuate the light-emitting diodes of the arrays, in particular individually actuate individual light-emitting diodes of the arrays. Information stating which light-emitting diodes of the arrays are actuated can be stored in the memory 130. For example, an array 101, 102, 103 can have a number of 480×240 image pixels. Each image pixel here can in turn have a number of at least two or three light-emitting diodes.

The combination optical unit 104 can also be in the form of two crossed plates, wherein the plates are schematically illustrated by way of the first and second reflection planes 117, 118. The plates provide the same function as the described reflection planes 117, 118.

In addition, the combination optical unit can also be a diffractive structure that makes possible the desired superposition of the electromagnetic rays from the three arrays.

The combination optical unit can additionally have a grating structure, wherein the grating structure superposes the electromagnetic rays from the three arrays in accordance with the described function of the combination optical unit in the overall radiation direction 116.

Figure 24:
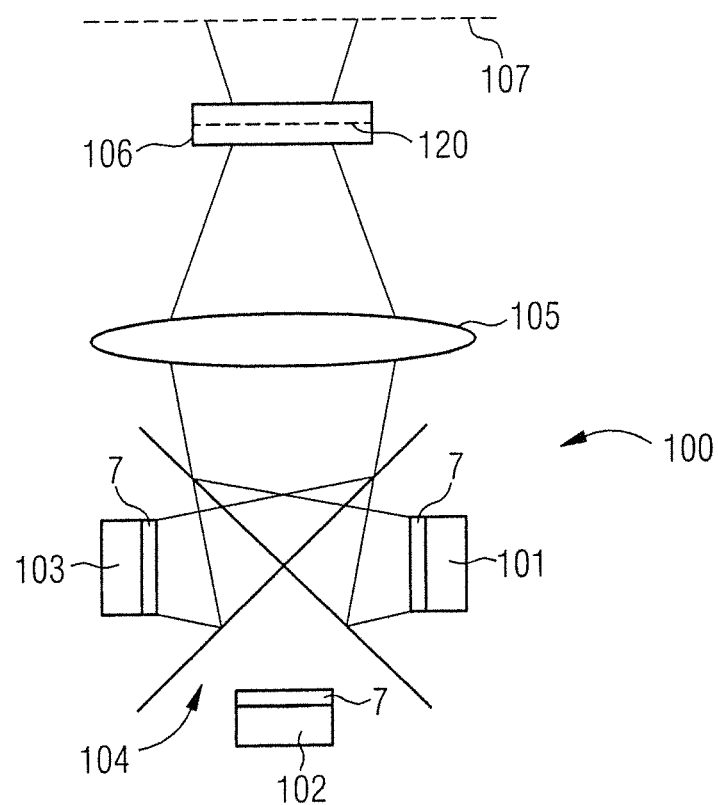
FIG. 24 shows a further example of an apparatus with an expanding element.

FIG. 24 shows a further apparatus 100 for presenting an image on a head-up display. The apparatus 100 is substantially in accordance with the apparatus 100 of FIG. 23, but in this example, the imaging optical unit 105 effects focusing of the electromagnetic radiation in an intermediate plane 120. An expanding element 106 is arranged in the intermediate plane 120. The expanding element 106 can be, for example, a diffuser element or a microlens array. The expanding element 106 expands the electromagnetic radiation again in the direction onto the image plane 107. The heads-up display is provided at the image plane 107.

Figure 25:
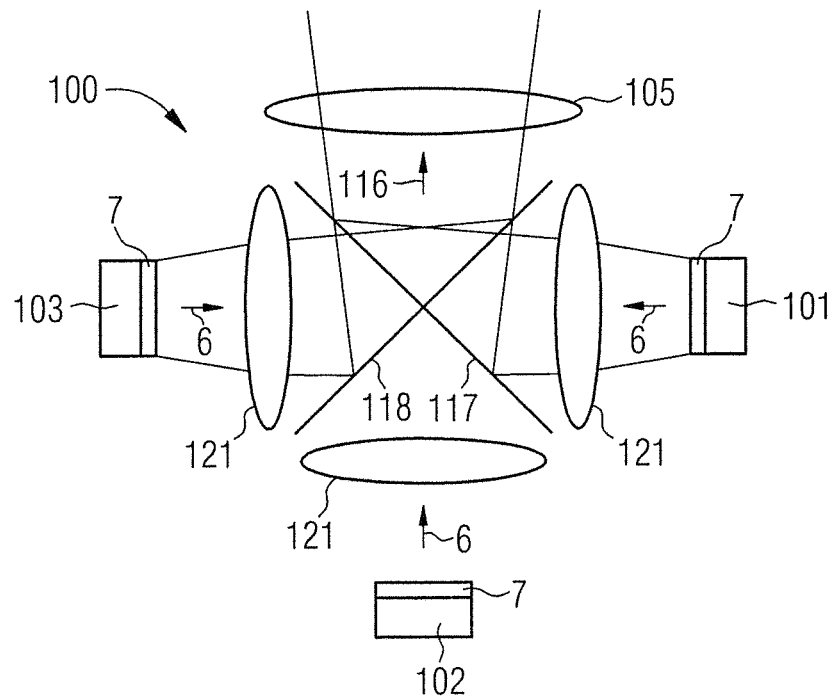
FIG. 25 shows a further example of an apparatus for presenting an image on a head-up display with an imaging optical unit between the combination optical unit and the arrays of the light-emitting diodes.

FIG. 25 shows a further example of the apparatus 100, substantially in accordance with the example of FIG. 23. However, in this example, a second imaging optical unit 121 is arranged between the respective arrays 101, 102, 103 and the combination optical unit 104. The second imaging optical unit 121 can perform further focusing of the electromagnetic radiation of the arrays 101, 102, 103. As for the rest, the apparatus 100 of FIG. 25 can be in accordance with FIG. 23.

Figure 26:
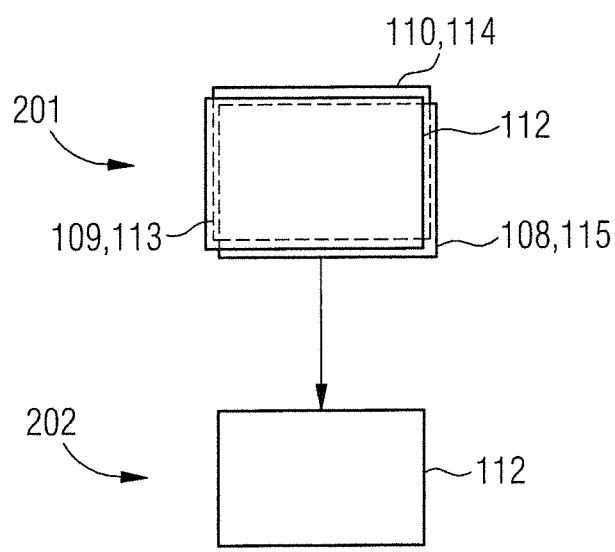
FIG. 26 shows a schematic illustration of two method steps for adjusting an image of a head-up display.

FIG. 26 shows a schematic illustration of two essential steps for a method of adjusting a control circuit for presenting an image for a head-up display. In a first step 201, at least two arrays of light-emitting diodes are used to produce, by way of corresponding actuation using the control circuit, in each case one partial image 108, 109, 110 which is superposed with the apparatus 100 in an image plane, as described above. Subsequently, a check is performed as to whether the partial images 108, 109, 110 of the three arrays 101, 102, 103 project in the image plane 107 laterally beyond a desired specified image 112. The desired image 112 is illustrated in the form of dashed lines.

In the illustrated example, each partial image 108, 109, 110 has an overlap region 113, 114, 115 projecting laterally beyond the specified image 112. The presence of the overlap regions 113, 114, 115 can be captured, for example, using a camera or using photodetectors. To this end, the camera connects, or the photodetectors connect, to the control circuit. The control circuit consequently receives the information that overlap regions 113, 114, 115 are present that project laterally beyond the specified image 112. In addition, the control circuit has corresponding information as to which light-emitting diodes of an array produce which overlap regions. Consequently, in a second step 202, the control circuit will actuate the arrays of the light-emitting diodes in a way such that no overlap regions 113, 114, 115 laterally of the specified image 112 are present anymore. This can be done, for example, by way of light-emitting diodes of edge regions of the arrays not being actuated and consequently not emitting any electromagnetic radiation. The corresponding information as to which light-emitting diodes are not actuated or which light-emitting diodes are actuated can be stored in the memory, which connects to the control circuit. Consequently, adjustment of the arrays can be achieved by simple means.

Figure 27:
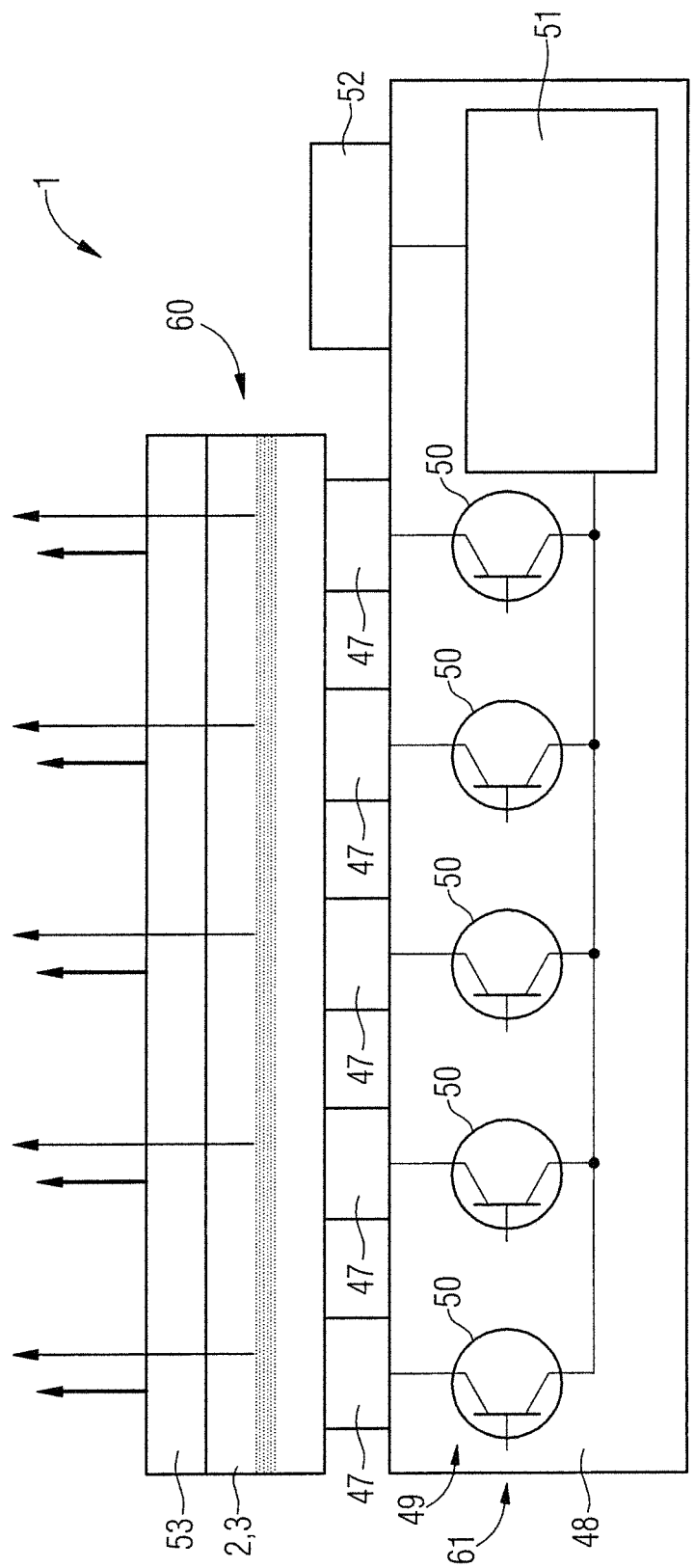
FIG. 27 shows a schematic illustration of an array.

FIG. 27 shows a schematic illustration of an apparatus 1 having an array 2 of light-emitting diodes 3, wherein the light-emitting diodes 3 are not illustrated individually. The light-emitting diodes 3 can be either individual components or monolithical in a single component 60. The array 2 connects to a substrate 48 via rear-side contacts 47. Integrated in the substrate 48 are electrical and/or electromagnetic circuits 49 that allow actuation of the light-emitting diodes 3 of the array 2. In particular, the electronic circuit 49 actuates individual light-emitting diodes 3 and supplies them individually with current. Consequently, the circuit 49 can have driver circuits 50 and selection circuits for the individual light-emitting diodes 3. For example, the electromagnetic circuit 49 consequently has a dedicated driver circuit 50 for each light-emitting diode 3. The circuit 49 can be integrated monolithically in the substrate 48 and represent a further component 61. In addition, an interface 51 can be integrated in the substrate 48, i.e., in the further component 61. The interface 51 connects to the electronic circuit 49 and in particular to the driver circuits 50. In addition, the interface 51 connects to electrical terminals 52 that are, for example, a contact pad on the substrate 48. The component 60 with the monolithically integrated light-emitting diodes 3 can be arranged on the further component 61 with the monolithically integrated circuit 49, as illustrated schematically in FIG. 27.

The substrate 48 can be formed, for example, from a semiconductor material, in particular silicon. For example, the substrate 48 can consist of a silicon wafer, in particular part of a silicon wafer. In the illustrated example, a light-emitting layer 53 is arranged on the array 2, which layer at least partially shifts the light from the light-emitting diodes 3 in terms of wavelength. It is possible here, for example, to use blue light-emitting diodes 3 and a light-emitting layer 53 that produces yellow light to produce approximately white light.

The electrical contacts of the light-emitting diodes 3 of the array 2 connect to the substrate 48 via the rear side. This prevents electrical contacts from absorbing electric radiation on the upper side of the light-emitting diodes 3. Electrical contacts can also be guided from the upper side of the array 2 to the rear side. In addition, electrical contacts can also be laterally guided from the upper side of the light-emitting diodes 3 to electrical terminals of the substrate 48.

Figure 28:
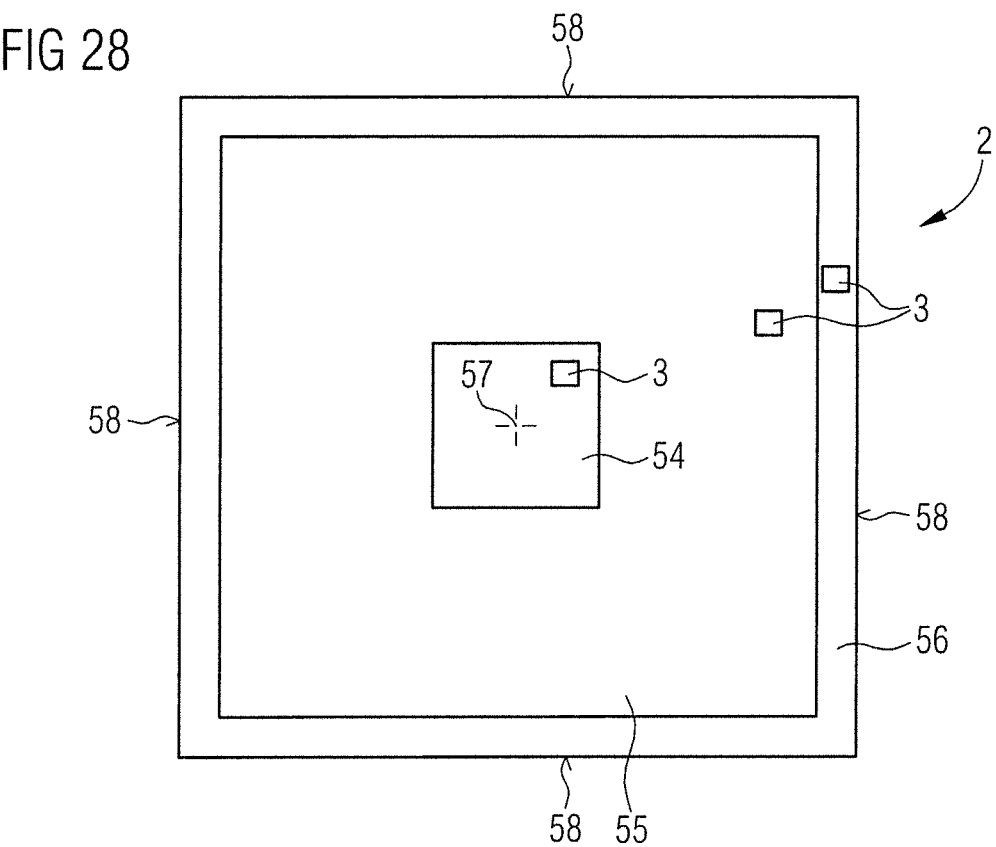
FIG. 28 shows a plan view of an example of an array.

FIG. 28 shows a schematic illustration of a plan view of an array 2 having different spacings for neighboring light-emitting diodes 3 in specified regions. Individual light-emitting diodes 3 are merely illustrated schematically. The array 2 can have, e.g., 400×400 light-emitting diodes 3 or more light-emitting diodes 3. The array 2 is divided into a central region 54, a surrounding region 55 and an edge region 56. The central region 54 is aligned concentrically with a center point 57 of the array 2. The surrounding region 55 and the edge region 56 are likewise arranged concentrically with respect to the center point 57. The central region 54 can have, e.g., the shape of an area of a circle, the shape of a rounded area of a circle or the shape of an area of a rectangle. The surrounding region 55 can have a rectangular outer contour and/or a rectangular inner contour. The surrounding region 55 can have a circular outer contour and/or a circular inner contour. The edge region 56 can have a rectangular outer contour and/or a rectangular inner contour. The edge region 56 can have a circular outer contour and/or a circular inner contour. The central region, the surrounding region and/or the outer edge region can also have different sizes and/or shapes.

For example, the spacings between neighboring light-emitting diodes 3 are of equal size in the central region 54 of the array 2. Neighboring light-emitting diodes 3 additionally have a smaller spacing in the central region 54 than in the surrounding region 55, which surrounds the central region 54. In the surrounding region 55, the spacings between neighboring light-emitting diodes 3 are of the same size. The spacings between neighboring light-emitting diodes 3 in the surrounding region 55 can be greater than the spacings between neighboring light-emitting diodes in the central region 54, e.g., by 10% or by 50% or by 100% or more. In addition, the spacings between neighboring light-emitting diodes in the outer edge region 56 can be greater than the spacings between the light-emitting diodes in the surrounding region 55, e.g., by 10% or by 50% or by 100% or more. The edge region 56 can also be omitted. The central region 54 is arranged concentrically around the center point 57 of the array 2 and extends, e.g., over 10% or over 20% of the width and the length of the array 2. The edge region 56 can encircle it and extend over up to 10% or 20% of the length and of the width of the array 2 starting from outer side edges 58 of the array 2.

In addition, the spacings between the light-emitting diodes 3 can also vary within the central region and/or within the surrounding region and/or within the edge region. For example, an average spacing between neighboring light-emitting diodes in the surrounding region can be greater than an average spacing between the light-emitting diodes in the central region, e.g., by 10% or by 50% or by 100% or more. In addition, an average spacing between neighboring light-emitting diodes in the outer edge region can be greater than the average spacing between the light-emitting diodes in the surrounding region, e.g., by 10% or by 50% or by 100% or more.

Figure 29:
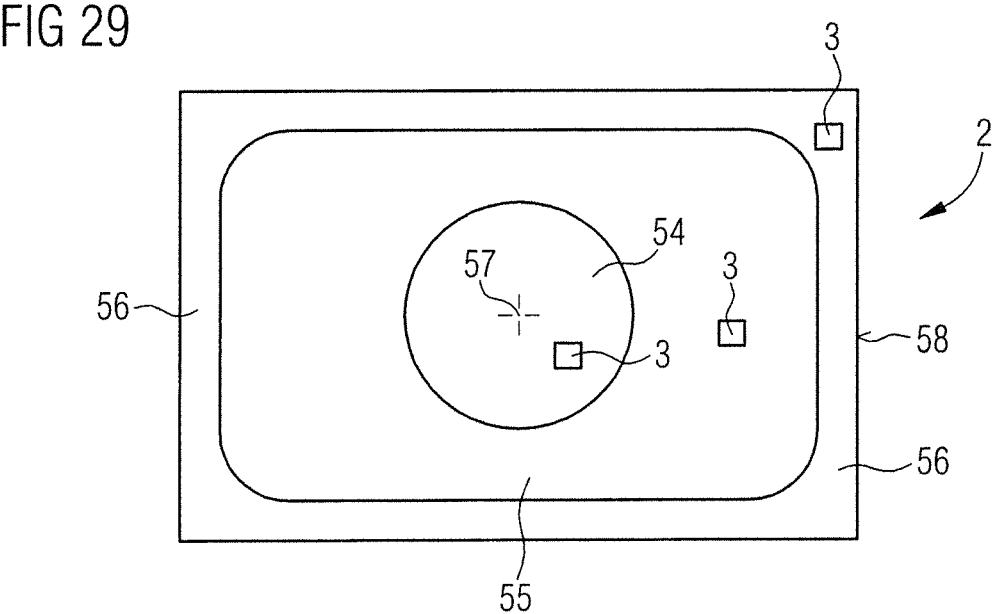
FIG. 29 shows a plan view of a further example of an array.

FIG. 29 shows a schematic illustration of a plan view of an further example of an array 2 having different spacings for neighboring light-emitting diodes 3 in specified regions. The arrangement is substantially set up as in FIG. 28, but in this case the central region 54 has the shape of a circular area and is arranged concentrically with respect to the center point 57 of the array 2. The edge region 56 has a rounded rectangular inner contour and a rectangular outer contour. The surrounding region 55 has a circular inner contour and a rectangular rounded outer contour.

Figure 30:
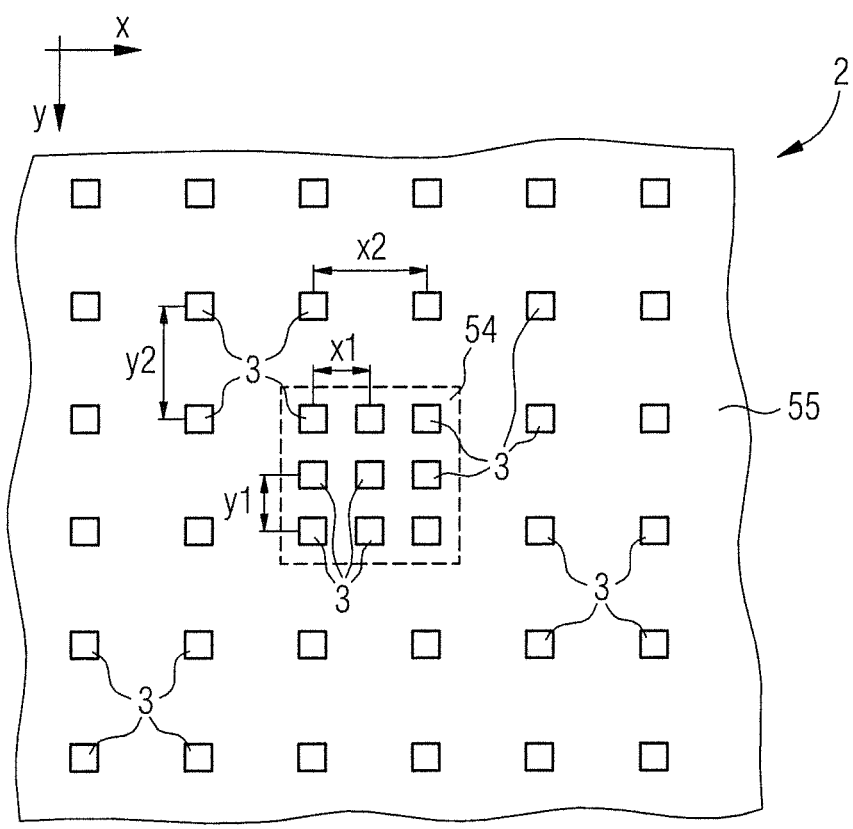
FIG. 30 shows a schematic illustration of a detail of an array with a central region and a surrounding region.

FIG. 30 shows a schematic illustration of a detail of an array 2 with a central region 54 and a surrounding region 55. The light-emitting diodes 3 are illustrated schematically in the form of squares. The central region 54 is separated from the surrounding region 55 by way of a fictitious dashed line. Arranged in the central region and in the surrounding region are the light-emitting diodes in each case in a grid with constant spacings. Neighboring light-emitting diodes 3 in the central region 54 have a smaller spacing in the x-direction and a smaller spacing in the y-direction as compared to the light-emitting diodes 3 in the surrounding region 55. x1 designates the spacing between the light-emitting diodes 3 in the x-direction in the central region 54. x2 designates the spacing between the light-emitting diodes 3 in the x-direction in the surrounding region 55. y1 designates the spacing between the light-emitting diodes 3 in the y-direction in the central region 54. y2 designates the spacing between the light-emitting diodes 3 in the y-direction in the surrounding region 55.

Figure 31:
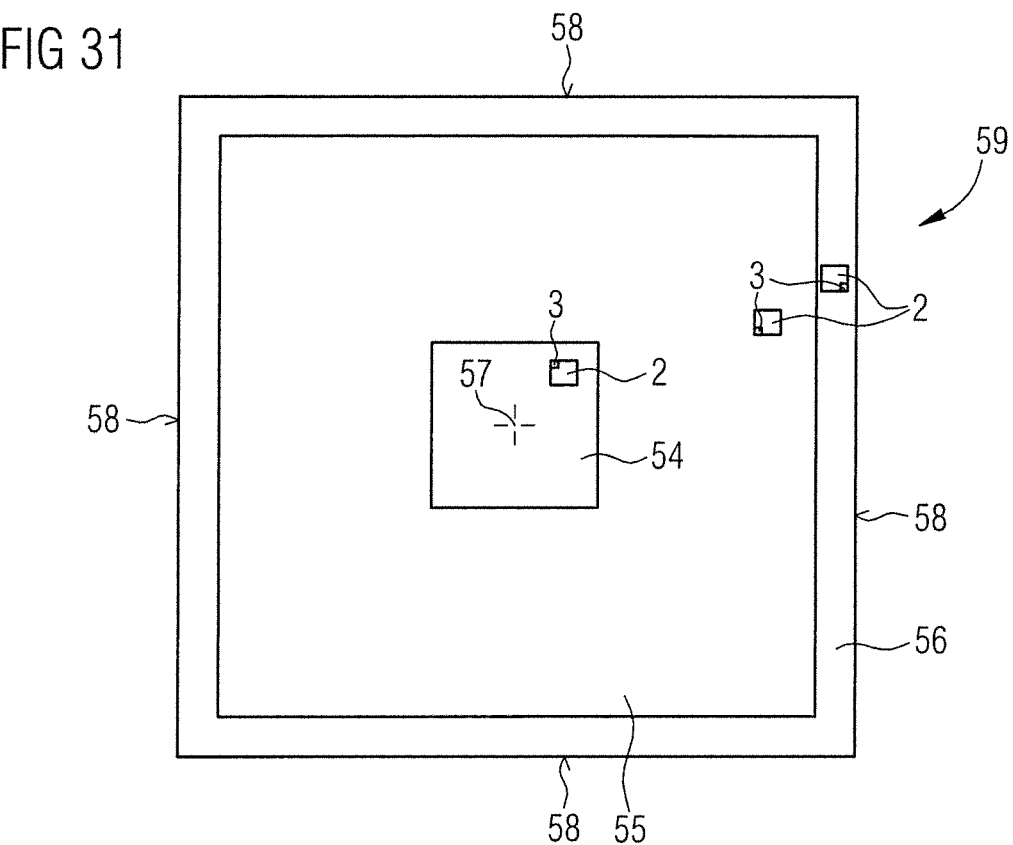
FIG. 31 shows a schematic illustration of a plan view of an arrangement with arrays of light-emitting diodes.

FIG. 31 shows a schematic illustration of a plan view of an arrangement 59 of arrays 2 having light-emitting diodes 3, wherein neighboring arrays 2 have different spacings in specified regions. Only individual ones of the arrays 2 and the light-emitting diodes 3 are schematically illustrated. The arrangement 59 can have a multiplicity of arrays 2. Each array 2 can have a multiplicity of light-emitting diodes 3. The arrangement 59 is divided into a central region 54, a surrounding region 55 and an edge region 56. The central region 54 is aligned concentrically with a center point 57 of the arrangement 59. The surrounding region 55 and the edge region 56 are likewise arranged concentrically with respect to the center point 57. The central region 54 can have, e.g., the shape of an area of a circle, the shape of a rounded area of a circle or the shape of an area of a rectangle. The surrounding region 55 can have a rectangular outer contour and/or a rectangular inner contour. The surrounding region 55 can have a circular outer contour and/or a circular inner contour. The edge region 56 can have a rectangular outer contour and/or a rectangular inner contour. The edge region 56 can have a circular outer contour and/or a circular inner contour. The surrounding region and/or the outer edge region can also have different sizes and/or shapes.

For example, the arrays 2 are arranged in a grid, wherein the spacings between neighboring arrays 2 are of the same size in the central region 54. Neighboring arrays 2 additionally have a smaller spacing in the central region 54 than in a surrounding region 55 that surrounds the central region 54. In the surrounding region 55, the spacings between neighboring arrays 2 are of the same size. The spacings between neighboring arrays 2 in the surrounding region 55 can be greater than the spacings between neighboring arrays in the central region 54, e.g., by 10% or by 50% or by 100% or more. In addition, an outer edge region 56 can surround the surrounding region 55, wherein the spacings between neighboring arrays 2 in the outer edge region are greater than the spacings between the arrays 2 in the surrounding region 55, e.g., by 10% or by 50% or by 100% or more. The edge region 56 can also be omitted. The central region 54 can be arranged concentrically around a center point of the arrangement and can extend over 10% or over 20% of the width and the length of the array 2. The edge region 56 can encircle it in the shape of a ring and extend over 10% or 20% of the length and of the width of the array 2 starting from outer side edges 58 of the arrangement 59. The central region 54 can have, e.g., the shape of an area of a circle, the shape of a rounded area of a circle or the shape of an area of a rectangle. The central region 54, the surrounding region 55 and/or the outer edge region 56 can also have different sizes and/or shapes.

In addition, the spacings between the arrays 2 can also vary within the central region 54 and/or within the surrounding region 55 and/or within the edge region 56. For example, an average spacing between neighboring arrays in the surrounding region can be greater than an average spacing between neighboring arrays in the central region, e.g., by 10% or by 50% or by 100% or more. In addition, an average spacing between neighboring arrays in the outer edge region can be greater than the average spacing between neighboring arrays in the surrounding region, e.g., by 10% or by 50% or by 100% or more.

Figure 32:
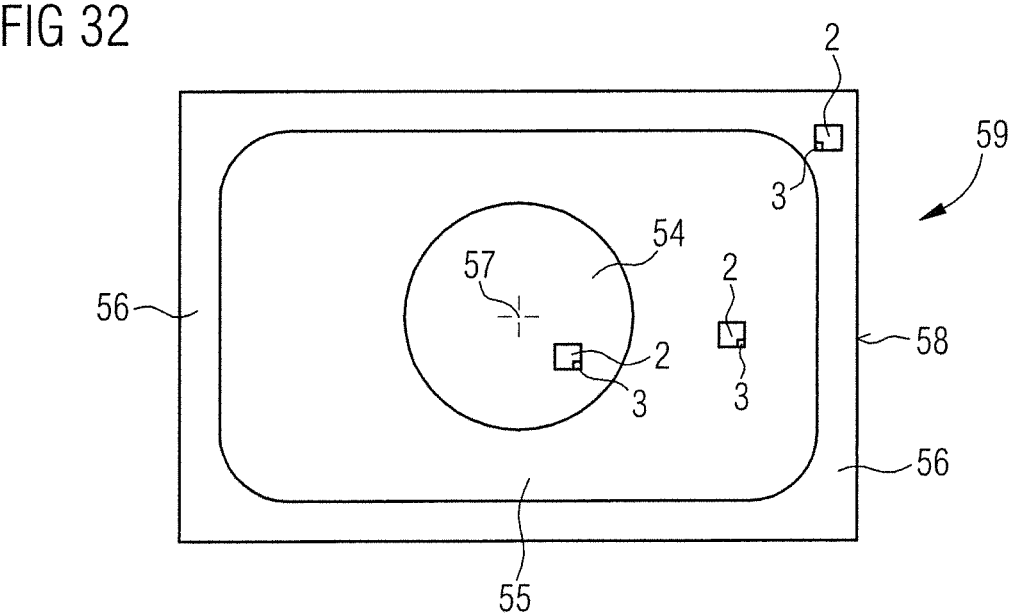
FIG. 32 shows a schematic illustration of a plan view of a further arrangement with arrays of light-emitting diodes.

FIG. 32 shows a schematic illustration of a plan view of a further example of an arrangement 59 of arrays 2 of light-emitting diodes 3 substantially like the arrangement of FIG. 31, but wherein the central region 54 has the shape of a circular area, and wherein an inner contour of the edge region 56 has a rounded rectangular shape.

Due to the smaller spacings between neighboring light-emitting diodes and/or neighboring arrays, the resolution is improved. Tests have shown that humans, when observing a display, perceive a central region with more optical precision than an edge region of a display. Consequently it is advantageous to provide a greater density of light-emitting diodes and/or arrays of light-emitting diodes in a central region of a display.

A light-emitting layer 53 can also be arranged on the light-emitting diodes 3 in all other examples of the previously described figures.

Our apparatus and methods are illustrated and described in more detail with reference to preferred examples. However, this disclosure is not limited to the disclosed examples. Rather, different variations can be derived herefrom by those skilled in the art without departing the scope of protection of the appended claims.

The invention claimed is:

1. An apparatus for presenting an image for a heads-up display comprising:
   three arrays of light-emitting diodes, wherein the light-emitting diodes of an array are arranged and output electromagnetic beams in an emission direction of an emission side of the array, the light-emitting diodes output an electromagnetic beam with a first opening angle in the emission direction,
   a collimation apparatus provided on the emission side at a specified spacing in front of the array of the light-emitting diodes, wherein the collimation apparatus reduces the first opening angles of the beams of the light-emitting diodes downstream of the collimation apparatus in the emission direction to a second opening angle, the second opening angle is smaller than the first opening angle, and
   a combination optical unit arranged downstream of the collimation apparatus in the emission direction, the combination optical unit superposes the electromagnetic rays from the three arrays to form an image for the head-up display,
   wherein the collimation apparatus has a reflection structure that tapers as viewed in the emission direction to an emission opening, and the reflection structure has an inner side,
   the inner side of the reflection structure ends directly at the emission opening of the reflection structure,
   the end of the inner side of the reflection structure surrounds and defines the emission opening of the reflection structure,
   the reflection structure has a cross section perpendicular to the emission direction that tapers in the emission direction of the electromagnetic radiation from the light-emitting diodes to the emission opening of the reflection structure, and
   the inner side of the reflection structure is reflective or scattering such that the electromagnetic beams of the light-emitting diodes are either emitted directly via the emission openings or, upon incidence on the inner side of the reflection structure, are reflected back and subsequently directed in a direction of the emission opening and emitted via the emission opening (of the reflection structure).

2. The apparatus as claimed in claim 1, wherein the combination optical unit has a diffractive structure, and the diffractive structure superposes the electromagnetic rays from the three arrays to form the image.

3. The apparatus as claimed in claim 1, wherein a control circuit that actuates the light-emitting diodes of an array is provided, and the control circuit does not actuate at least some of the light-emitting diodes of an array during operation, wherein, optionally, the control circuit has a memory, information is stored in the memory, and the information indicates which light-emitting diodes may be actuated during operation to avoid an overlap of electromagnetic radiation of an array beyond a specified image.

4. A method of adjusting a control circuit for presenting an image for the heads-up display according to claim 1, comprising:
providing at least two arrays of light-emitting diodes, wherein the light-emitting diodes of each array are individually actuable by a control circuit, and the light-emitting diodes of an array output electromagnetic beams in an emission direction of an emission side of the array,
providing a combination optical unit in the emission directions of the arrays, wherein the combination optical unit superposes the electromagnetic rays of the three arrays to form an image for a heads-up display, wherein generating a test image with at least two arrays, performing a check as to whether a partial image of an array projects beyond a specified image, and, upon detecting an overlap of the partial image beyond the image,
setting the control circuit of the apparatus in a way such that the light-emitting diodes that cause the overlap are not actuated.

5. A method of operating an apparatus for presenting an image for the heads-up display according to claim 1, comprising:
providing three arrays of light-emitting diodes, wherein the light-emitting diodes of each array are individually actuable by a control circuit, and the light-emitting diodes of an array output electromagnetic beams in an emission direction of an emission side of the array,
providing a combination optical unit in the emission directions of the arrays, wherein the combination optical unit superposes the electromagnetic rays of the three arrays to form an image for a head-up display, and
causing the control circuit to actuate the light-emitting diodes of the arrays such that an overlap of a partial image of an array beyond the image is prevented.

6. The apparatus as claimed in claim 1, wherein the reflection structure comprises a cylinder cone, the reflection structure exhibits a rotational symmetry with respect to a central axis, wherein, as viewed in the emission direction, the cylinder cone has the emission opening, and the emission opening is arranged perpendicular to the central axis.

7. The apparatus as claimed in claim 1, wherein the reflection structure comprises a pyramid cone, the reflection structure exhibits a symmetry with respect to a central axis, wherein, as viewed in the emission direction, the pyramid cone has the emission opening, and the emission opening is arranged perpendicular to the central axis.

8. An apparatus for presenting an image for a heads-up display comprising:
three arrays of light-emitting diodes, wherein the light-emitting diodes of an array are arranged and output electromagnetic beams in an emission direction of an emission side of the array, the light-emitting diodes output an electromagnetic beam with a first opening angle in the emission direction,
a collimation apparatus provided on the emission side at a specified spacing in front of the array of the light-emitting diodes, wherein the collimation apparatus reduces the first opening angles of the beams of the light-emitting diodes downstream of the collimation apparatus in the emission direction to a second opening angle, and the second opening angle is smaller than the first opening angle, and
a combination optical unit arranged downstream of the collimation apparatus in the emission direction, and the combination optical unit superposes the electromagnetic rays from the three arrays to form an image for the head-up display,
wherein the combination optical unit is an imaging optical unit, the imaging optical unit focuses the electromagnetic rays from the three arrays in an intermediate plane to form an intermediate image, an optical expanding element is provided in the intermediate plane, and the expanding element expands the intermediate image for an image plane, and
the collimation apparatus has a pinhole plate and a sub-lens array, the pinhole plate has a plurality of holes, the sub-lens array has a plurality of sub-lenses, and one sub-lens is associated with each hole in the pinhole plate.

9. The apparatus as claimed in claim 8, wherein the collimation apparatus has a plurality of collimation lenses, one collimation lens is provided for a beam from a maximum of three light-emitting diodes, and the collimation lens decreases the first opening angle of the beams from the light-emitting diodes to the second opening angle.

10. The apparatus as claimed in claim 8, wherein the collimation apparatus has a spacing from the light-emitting diodes shorter than an edge length of a light-emitting diode.

11. The apparatus of claim 8, wherein the collimation apparatus has a pinhole plate and a sub-lens array, the pinhole plate has a plurality of holes, the sub-lens array has a plurality of sub-lenses, and one sub-lens is associated with each hole in the pinhole plate.

12. An apparatus for presenting an image for a heads-up di splay comprising:
three arrays of light-emitting diodes, wherein the light-emitting diodes of an array are arranged and output electromagnetic beams in an emission direction of an emission side of the array, and the light-emitting diodes output an electromagnetic beam with a first opening angle in the emission direction,
a collimation apparatus provided on the emission side at a specified spacing in front of the array of the light-emitting diodes, wherein the collimation apparatus reduces the first opening angles of the beams of the light-emitting diodes downstream of the collimation apparatus in the emission direction to a second opening angle, and the second opening angle is smaller than the first opening angle, and
a combination optical unit arranged downstream of the collimation apparatus in the emission direction, and the combination optical unit superposes the electromagnetic rays from the three arrays to form an image for the head-up display,
wherein at least one array has different spacings for neighboring light-emitting diodes in a first specified region compared to a second specified region,
the light-emitting diodes are arranged in a grid of x-axes and y-axes, and the x-axes are parallel to each other,
the y-axes are parallel to each other,
the x-axes are perpendicular to the y-axes,
at least two neighboring light-emitting diodes of the first specified region have a smaller spacing in an x-direction along the x-axis, and/or at least two neighboring light-emitting diodes of the first specified region have a smaller spacing in a y-direction along the y-axis compared to the light-emitting diodes of the second specified region.

13. The apparatus of claim 12, wherein the array is divided into a central region and a surrounding region, and neighboring light-emitting diodes have a smaller spacing in the central region than in the surrounding region.

14. The apparatus of claim 13, wherein the spacings between neighboring light-emitting diodes in the surrounding region are by at least 10% greater than the spacings between neighboring light-emitting diodes in the central region.

15. The apparatus of claim 13, wherein spacings between the light-emitting diodes vary within the central region and/or within the surrounding region, and an average spacing between neighboring light-emitting diodes in the surrounding region can be greater than an average spacing between the light-emitting diodes in the central region by at least 10%.

16. The apparatus of claim 12, wherein the central region is aligned concentrically with a center point of the array, and the surrounding region is arranged concentrically with respect to the center point surrounding the central region.

17. The apparatus of claim 12, wherein the neighboring light-emitting diodes of the first specified region have a smaller spacing in the x-direction along the x-axis, or
the neighboring light-emitting diodes of the first specified region have a smaller spacing in the y-direction along the y-axis compared to the light-emitting diodes of the second specified region.

18. The apparatus of claim 12, wherein the neighboring light-emitting diodes of the first specified region have a smaller spacing in the x-direction along the x-axis, and
the neighboring light-emitting diodes of the first specified region have a smaller spacing in the y-direction along the y-axis compared to the light-emitting diodes of the second specified region.

19. An apparatus for presenting an image for a heads-up display comprising:
three arrays of light-emitting diodes, wherein the light-emitting diodes of an array are arranged and output electromagnetic beams in an emission direction of an emission side of the array, the light-emitting diodes output an electromagnetic beam with a first opening angle in the emission direction,
a collimation apparatus provided on the emission side at a specified spacing in front of the array of the light-emitting diodes, wherein the collimation apparatus reduces the first opening angles of the beams of the light-emitting diodes downstream of the collimation apparatus in the emission direction to a second opening angle, and the second opening angle is smaller than the first opening angle, and
a combination optical unit arranged downstream of the collimation apparatus in the emission direction, and the combination optical unit superposes the electromagnetic rays from the three arrays to form an image for the head-up display,
wherein the combination optical unit is an imaging optical unit, the imaging optical unit focuses the electromagnetic rays from the three arrays in an intermediate plane to form an intermediate image, an optical expanding element is provided in the intermediate plane, and the expanding element expands the intermediate image for an image plane,
wherein the collimation apparatus has an optical filter element, and the filter element transmits beams in a specified angle of incidence range, wherein
the filter element has a mirror with dielectric layers, the mirror is transparent for the beams in the angle of incidence range, and the mirror is reflective and/or absorbing for beams outside the angle of incidence range,
the layers of the mirror are formed such that the electromagnetic radiation that is incident on the incidence side of the mirror at an angle of less than 45° is reflected, and the incident side of the mirror is a plane face, and
the dielectric layers of the mirror are formed such that the electromagnetic radiation passes through the mirror when the electromagnetic radiation is incident on the incidence side of the mirror at an angle of between 45° and 135°.

20. An apparatus for presenting an image for a heads-up display comprising:
three arrays of light-emitting diodes, wherein the light-emitting diodes of an array are arranged and output electromagnetic beams in an emission direction of an emission side of the array, the light-emitting diodes output an electromagnetic beam with a first opening angle in the emission direction,
a collimation apparatus provided on the emission side at a specified spacing in front of the array of the light-emitting diodes, wherein the collimation apparatus reduces the first opening angles of the beams of the light-emitting diodes downstream of the collimation apparatus in the emission direction to a second opening angle, and the second opening angle is smaller than the first opening angle, and
a combination optical unit arranged downstream of the collimation apparatus in the emission direction, and the combination optical unit superposes the electromagnetic rays from the three arrays to form an image for the head-up display,
wherein the combination optical unit is an imaging optical unit, the imaging optical unit focuses the electromagnetic rays from the three arrays in an intermediate plane to form an intermediate image, an optical expanding element is provided in the intermediate plane, and the expanding element expands the intermediate image for an image plane,
wherein the collimation apparatus has reflection structures, the reflection structures taper as viewed in the emission direction to an emission opening, and a reflection structure has inner sides,
the inner sides of a reflection structure end at an emission opening of the reflection structure, and
the reflection structures have a cross section perpendicular to the emission direction that tapers in the emission direction of the electromagnetic radiation from the light-emitting diodes to the emission opening of the reflection structure.

* * * * *